US012771791B2

(12) United States Patent
Hayashi

(10) Patent No.: US 12,771,791 B2
(45) Date of Patent: Oct. 20, 2026

(54) QUALITY INSPECTION SYSTEM AND METHOD

(71) Applicant: CANON KABUSHIKI KAISHA, Tokyo (JP)

(72) Inventor: Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 18/746,136

(22) Filed: Jun. 18, 2024

(65) Prior Publication Data

US 2025/0008026 A1 Jan. 2, 2025

(30) Foreign Application Priority Data

Jun. 29, 2023 (JP) ................................ 2023-107225

(51) Int. Cl.
*H04N 1/00* (2006.01)

(52) U.S. Cl.
CPC ..... *H04N 1/00023* (2013.01); *H04N 1/00031* (2013.01); *H04N 1/00408* (2013.01)

(58) Field of Classification Search
CPC ........... H04N 1/00023; H04N 1/00031; H04N 1/00408
USPC .......................................................... 358/1.1
See application file for complete search history.

(56) References Cited

U.S. PATENT DOCUMENTS

| | | | | |
|---|---|---|---|---|
| 10,200,557 B2 * | 2/2019 | Okumura | ........... | H04N 1/32539 |
| 11,822,840 B2 * | 11/2023 | Fujita | .................... | G06F 3/1208 |
| 2017/0230543 A1 * | 8/2017 | Futamata | .............. | G06F 3/1204 |
| 2021/0072933 A1 * | 3/2021 | Yasaki | ............... | H04N 1/00034 |

FOREIGN PATENT DOCUMENTS

JP 2023016499 A 2/2023

* cited by examiner

*Primary Examiner* — Allen H Nguyen

(74) *Attorney, Agent, or Firm* — Venable LLP

(57) ABSTRACT

A quality inspection system includes an information processing device and an image formation system. The information processing device includes an acquisition unit that acquires information relating to a quality inspection device included in the image formation system; a reception unit that receives information relating to quality inspection to be executed by the quality inspection device; a display unit that displays a quality inspection device for executing quality inspection corresponding to the information being received by the reception unit, based on the information relating to the quality inspection device being acquired by the acquisition unit in a selectable manner by a user; and a transmission unit that transmits, to the image formation system, an instruction for causing the quality inspection device selected by the user to execute the quality inspection.

17 Claims, 27 Drawing Sheets

FIG. 5A 505 601 602

| Task | | Instrument | | |
|---|---|---|---|---|
| | | Inline sensor | Sensing unit | Inspection unit |
| Spectrophotometric analysis | Quick | Supported | Not Supported | Not Supported |
| | High quality | Not Supported | Supported | Not Supported |
| Density analysis | | Not Supported | Supported | Not Supported |
| Registration check | | Not Supported | Supported | Not Supported |
| Inspection | | Not Supported | Not Supported | Supported |
| Engine calibration | | Supported | Not Supported | Not Supported |
| Media calibration | | Not Supported | Supported | Not Supported |

FIG. 5B

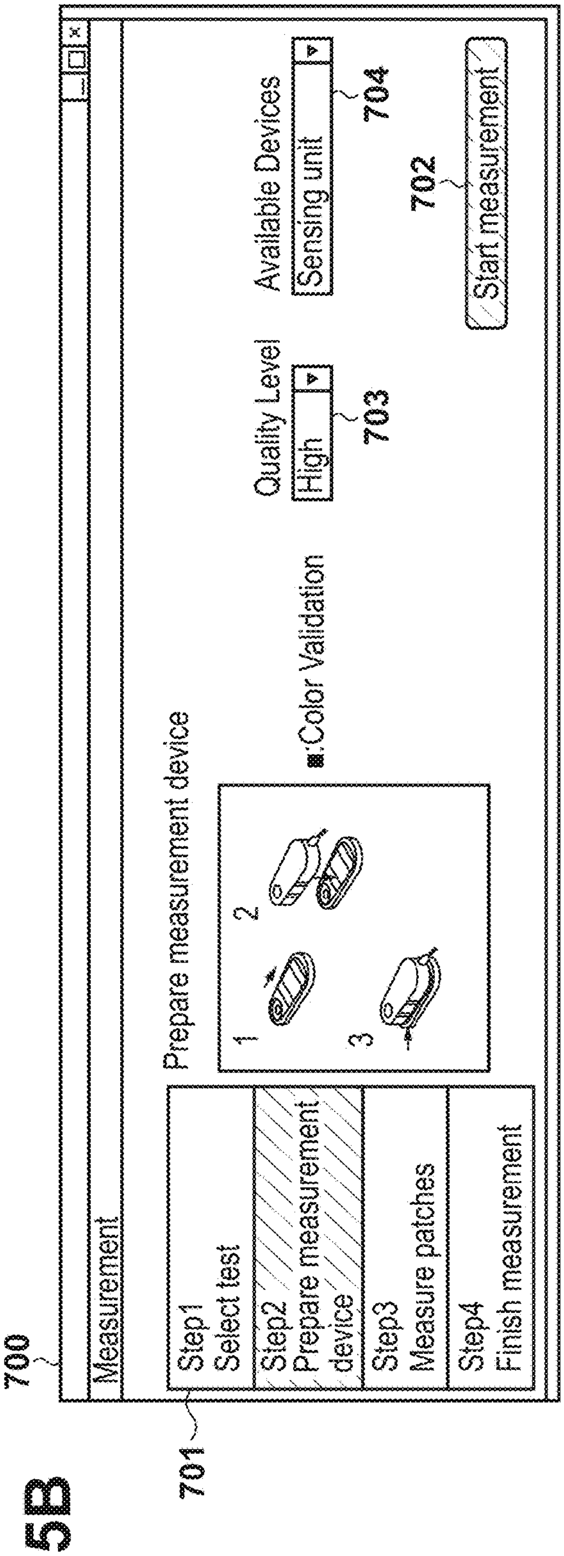

FIG. 7A

900

```
<JDF DescriptiveName="Quailty Control test" DateTime="2023-03-20,15:00">
  <ResourcePool>
     ...
     <Media Demensions="297 420" MediaType="Paper"/>        902        903
     <DigitalPrintingParams/>
     <QualityControlParams SourceDeviceID="Printer106" QualityControlMethods="Colorimetry">
904     <FileSpec URL="https://xxxxxx/xxxx/test.pdf"/>
905     <Module ID="Inline sensor302"/>
     </QualityControlParams>
  </ResourcePool>
  ......
</JDF>
```

FIG. 7B

901

```
<JDF DescriptiveName="Quality Control test result" DateTime="2023-03-20,15:16">
  <ResourcePool>
     ...
     <QualityControlResult SourceDeviceID="Printer106" ~906
          Start="2023-03-20, 15:01"
          End="2023-03-20, 15:15"
          QualityControlMethods="Colorimetry"> ~907
908    <Module ID="Inline sensor302"/>
       <ColorMeasurement>...<ColorMeasurement> ~909
     </QualityControlResult>
  </ResourcePool>
  ......
</JDF>
```

FIG. 7C

910

```
<JMF DateTime="2023-03-20, 15:00">
   <QueryKnownDevices ReturnCode="0">
      <DeviceFilter DeviceDetails="Full"/>
   </QueryKnownDevices>
</JDF>
```

FIG. 7D 911, 912, 913, 914

```
<JMF DateTime="2023-03-20, 15:00">
   <ResponseKnownDevices ReturnCode="0">
      <Device DeviceID="Printer106">
         <Module ModuleID="inline sensor 302" ManufactureURL="https://xxxxxxx/xxxxxx/inlinsensor"/>
         <Module ModuleID="sensing unit 300" ManufactureURL="https://xxxxxxx/xxxxxx/sensingunit"/>
         <Module ModuleID="inspection unit 301" ManufactureURL="https://xxxxxxx/xxxxxx/inspectionunit"/>
      </Device>
   </ResponseKnownDevices>
</JDF>
```

| 1400 | 1404 | 1405 | 1406 | 1401 | 1402 | 1403 | |
|---|---|---|---|---|---|---|---|
| ID | Test name | Start time | End time | Device ID | Instruments | Test spec | Color Measurements |
| 1 | Quality control test1 | March 20, 2023-8:00 | March 20, 2023-8:16 | Printer 106 | Inline sensor 303 | FORGA | ... |
| 2 | Quality control test1 | March 20, 2023-15:00 | March 20, 2023-15:20 | Printer 106 | Inline sensor 303 | FORGA | ... |
| 3 | Quality contro test2 | March 20, 2023-8:00 | March 20, 2023-8:13 | Printer 109 | Inline sensor 305 | FORGA | ... |
| 4 | Quality control test3 | March 20, 2023-8:00 | March 20, 2023-8:13 | Printer 109 | Inline sensor 305 | GRACOL | ... |

FIG. 20A 2300, 2302, 2303

```
<JDF DescriptiveName="Quality Control test" DateTime="2023-03-20,15:00">
  <ResourcePool>
     ...
     <Media Demensions="297 420" MediaType="Paper"/>
     <DigitalPrintingParams/>
     <QualityControlParams SourceDeviceID="PrinterA" QualityControlMethods="Colorimetry">
        <FileSpec URL="https://xxxxxx/xxxx/test.pdf"/>
        <Module ID="Inline sensor302" ManufactureURL="https://xxxxxxx/xxxxxx/inlinsensor"/>
        <Module ID="Inline sensor303" ManufactureURL="https://xxxxxxx/xxxxxx/inlinsensor"/>
     </QualityControlParams>
  </ResourcePool>
  ......
</JDF>
```

FIG. 20B 2301, 2304, 2305

```
<JDF DescriptiveName="Quality Control test result" DateTime="2023-03-20,15:16">
  <ResourcePool>
     ...
     <QualityControlResult SourceDeviceID="PrinterA"
         Start="2023-03-20, 15:01"
         End="2023-03-20, 15:15"
         QualityControlMethods="Colorimetry">
       <Module ID="Inline sensor302"/>
       <ColorMeasurement>...</ColorMeasurement>
     </QualityControlResult>
     <QualityControlResult SourceDeviceID="PrinterA"
         Start="2023-03-20, 15:30"
         End="2023-03-20, 15:46"
         QualityControlMethods="Colorimetry">
       <Module ID="Sensing sensor302"/>
       <ColorMeasurement>...</ColorMeasurement>
     </QualityControlResult>
  </ResourcePool>
  ......
</JDF>
```

| Help ID (3000) | Name (3001) | Modified (3002) | Blob type (3003) | Size (3004) |
|---|---|---|---|---|
| 1 | inlinesensor.json | 11/27/2019,1:53 | Block blog | 9B |
| 2 | sensingunit.json | 3/11/2019,10:18 | Block blog | 9B |
| 3 | inspectionunit.json | 2/25/2019,11:59 | Block blog | 9B |

QUALITY INSPECTION SYSTEM AND METHOD

BACKGROUND OF THE INVENTION

Field of the Invention

The present invention relates to a quality inspection system and a method for executing quality inspection.

Description of the Related Art

A customer requires a high standard regarding cleanliness, alignment between a front side and a back side, and color consistency for a commercial print material such as a catalog and a brochure, and hence more precise inspection and image adjustment are required. Meanwhile, in an inspection step before delivery to a customer, inspection work and recovery work such as visual inspection of a printed image and re-printing of a page with an output defect require a significant amount of workforce and time. In order to consistently produce a high-quality output, a skilled user and a significant amount of time for image adjustment before printing and during printing are required.

In order to satisfy those demands, there has been known a quality inspection device that can add an inspection function to an image processing device. As one quality inspection device, an inline sensor embedded in an image formation device is known. Further, a sensing unit that is mounted to an image processing device afterward is known. Those quality inspection devices can automate tasks such as color measurement, image alignment between a front side and a back side, and color adjustment that have hitherto been dependent on manual labor. In order to maintain an optimal state continuously during printing, it is possible to compare image alignment on a front side and a back side and color consistency with the settings to perform an automatic correction while printing.

In order to automate quality inspection by using such a quality inspection device, a quality inspection device needs to be selected according to a purpose of a user. Japanese Patent Application Laid-Open No. 2023-16499 describes that, based on chart configuration information and specification information relating to a measurement device being selected, whether the measurement device can execute color measurement desired by a user is presented.

However, Japanese Patent Application Laid-Open No. 2023-16499 does not indicate the matter that an appropriate measurement device is selected from a plurality of measurement devices, based on a condition other than the chart configuration information. There is a demand for improving convenience of selecting a quality inspection device for executing desired quality inspection.

SUMMARY OF THE INVENTION

The present invention provides a quality inspection system that improves convenience of selecting a quality inspection device for executing desired quality inspection.

The present invention in one aspect provides a quality inspection system comprising: an information processing device; and an image formation system, the information processing device comprising: at least one processor and at least a memory coupled to the at least one processor and having instructions stored thereon, and when executed by the at least one processor, acting as: an acquisition unit configured to acquire information relating to a quality inspection device included in the image formation system; a reception unit configured to receive information relating to quality inspection to be executed by the quality inspection device; a display unit configured to display a quality inspection device for executing quality inspection corresponding to the information being received by the reception unit, based on the information relating to the quality inspection device being acquired by the acquisition unit in a selectable manner by a user, a transmission unit configured to transmit, to the image formation system, an instruction for causing the quality inspection device being selected by the user to execute the quality inspection, and the image formation system comprising: at least one processor and at least a memory coupled to the at least one processor and having instructions stored thereon, and when executed by the at least one processor, acting as: an execution unit configured to execute the quality inspection by the quality inspection device, based on the instruction being transmitted from the transmission unit.

Further features of the present invention will become apparent from the following description of exemplary embodiments (with reference to the attached drawings).

BRIEF DESCRIPTION OF THE DRAWINGS

FIG. 5A and FIG. 5B are diagrams illustrating a database and a user interface screen.

FIG. 7A to FIG. 7D are diagrams illustrating data communicated between systems.

FIG. 20A and FIG. 20B are diagrams illustrating communication data.

DESCRIPTION OF THE EMBODIMENTS

Figure 1A:
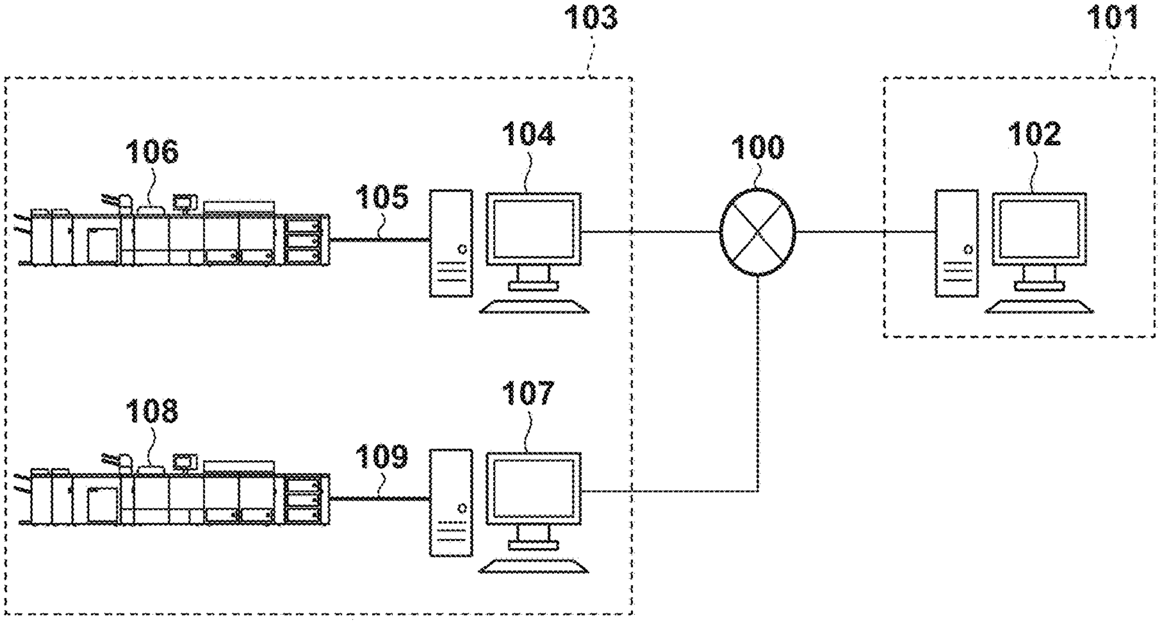
FIG. 1A and FIG. 1B are diagrams illustrating a configuration of a system and a device.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

FIG. 1A is a block diagram illustrating a configuration of a quality inspection system in the present embodiment.

Note that, unless otherwise specified, the quality inspection system described in the present embodiment may be a system including a single device or a system including a plurality of devices as long as an operation of the quality inspection system can be executed.

Unless otherwise specified, the quality inspection system described in the present embodiment may be a system in which processing is executed by establishing connection via a network such as a LAN and a WAN, as long as an operation of the quality inspection system can be executed.

The system in the present embodiment includes a web system 101 and a printing services system 103, and both the systems are connected to each other via a network 100 such as the Internet. Note that the network 100 may be a wired network, a wireless network, or a network including both of them. The web system 101 includes an information processing device 102. The information processing device 102 is a device that can communicate with the printing services system 103, and may be a device configured as a cloud, for example. The printing services system 103 is an image formation system including information processing devices 104 and 107 and image formation devices 106 and 108. The image formation device 106 is controlled under a program group operated on the information processing device 104, and it processes a printing setting and printing data that are received from the web system 101 to produce a print material. The image formation device 108 is controlled under a program group operated on the information processing device 107, and it processes a printing setting and printing data that are received from the web system 101 to produce a print material. The information processing device 104 is connected to the image formation device 106 via a communication path 105, and the information processing device 107 is connected to the image formation device 108 via a communication path 109. Note that the communication paths 105 and 109 may be a network or may be a cable for establishing one-on-one connection.

In the present embodiment, the system illustrated in FIG. 1A enables execution and control quality inspection such as color validation remotely from the information processing device 102. In the present embodiment, it is assumed that four steps are executed as quality inspection. In other words, in the first step, a test type is selected. In the present embodiment, description is made on one example in which a color validation test is selected. In the second step, a quality inspection device for executing the selected test is selected. In the third step, quality inspection is executed. For example, in the present embodiment, patch color measurement is executed. In the fourth step, the quality inspection is completed. FIG. 1A illustrates two pairs of the information processing devices and the image formation devices in the printing services system 103. However, the number of pairs may be one, three, or more.

Figure 13:
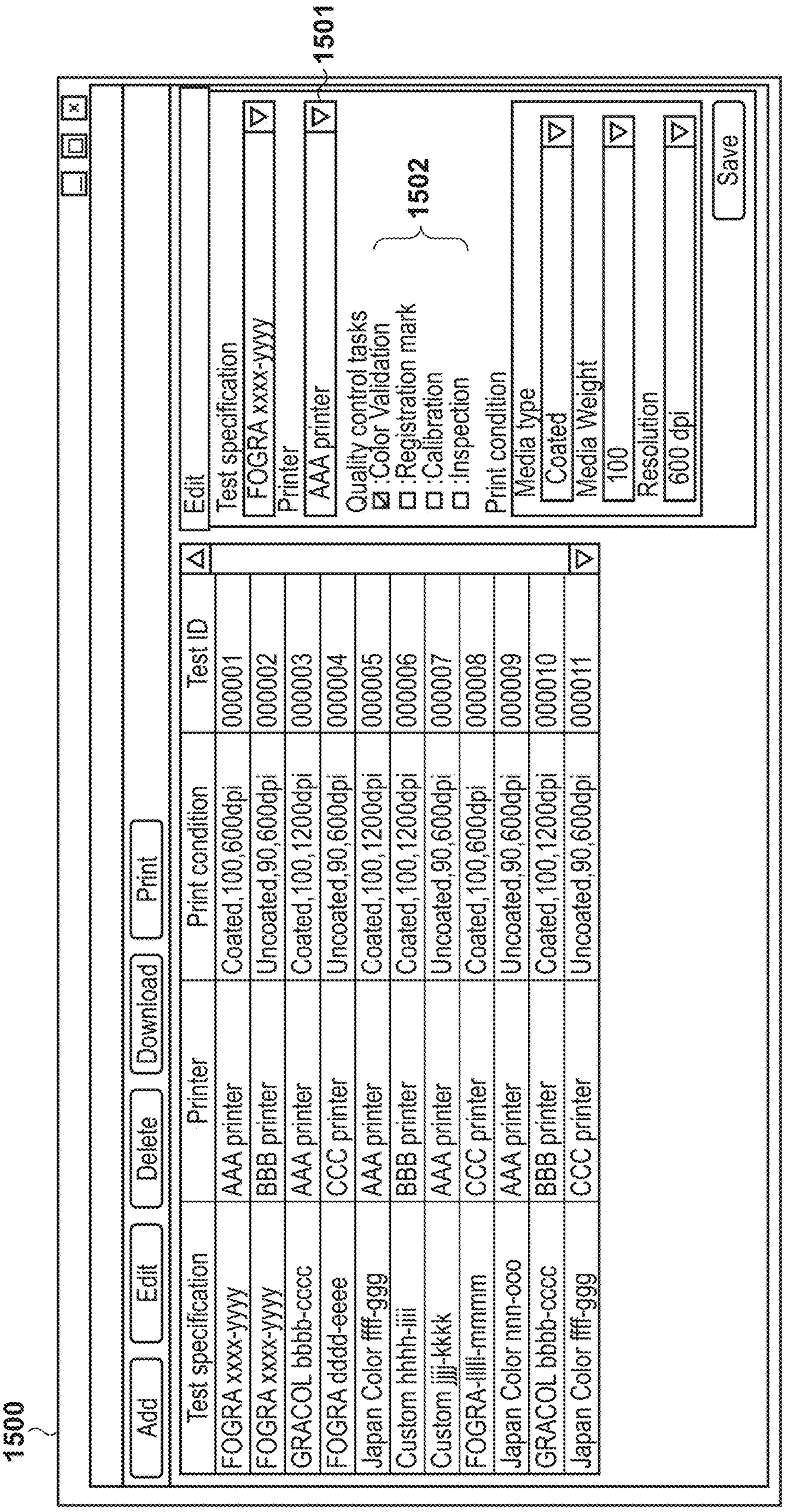
FIG. 13 is a diagram illustrating a user interface screen.

FIG. 13 is a diagram illustrating one example of a screen for receiving selection of a test type of quality inspection. A quality inspection test selection screen 1500 is displayed on the information processing device 102. On the quality inspection test selection screen 1500, in a menu 1501, selection of an image formation device is received. In a menu 1502, selection of a test type of quality inspection is received. In the present embodiment, as one example, description is made on a case where selection of color validation is received as a type of quality inspection.

Figure 1B:
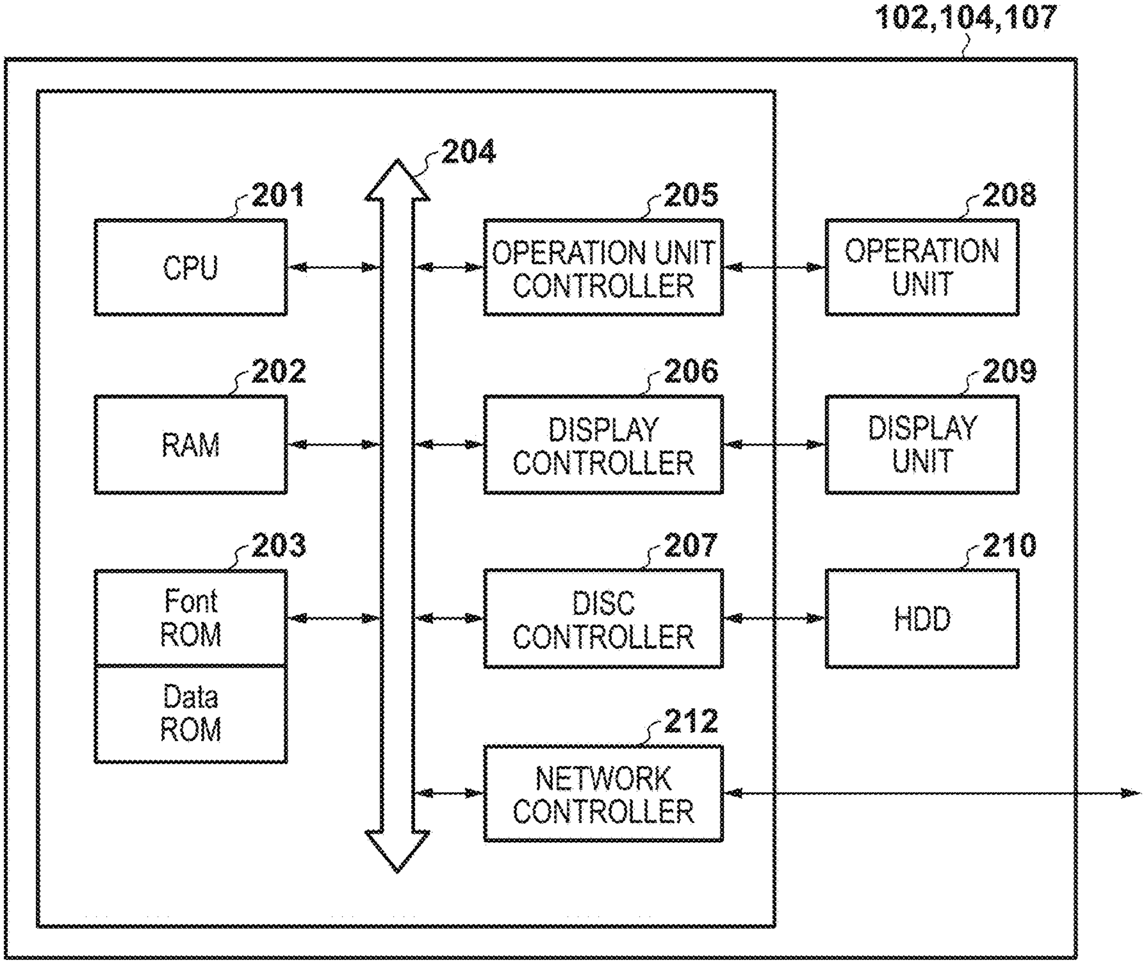

FIG. 1B is a block diagram illustrating one example of a configuration of the information processing devices 102, 104, and 107. The information processing device 102 is described below as a representative example of the information processing devices 102, 104, and 107. In FIG. 1B, a CPU 201 executes an operating system (OS) or a general application program that is stored in a program ROM of a ROM 203 or loaded from an HDD 210 to a RAM 202. The ROM 203 includes a font ROM or a data ROM. The RAM 202 functions as a main memory, a work area, or the like of the CPU 201. The operation of the information processing device 102 according to the present embodiment is realized by the CPU 201, for example, reading a program stored in the ROM 203 to the RAM 202 and executing the same.

An operation unit controller 205 controls an input from an operation unit 208 such as a keyboard and a pointing device. A display controller 206 controls display on a display unit 209. A disc controller 207 controls an access to the HDD 210 or the like that stores a boot program, various applications, font data, and the like. A network controller 212 is connected to a network and executes processing of controlling communication with another device connected to the network. Note that the network controller 212 may include a configuration according to a network medium, and it may execute communication of different types. A bus 204 connects the CPU 201 and the RAM 202 to each other and the ROM 203 and various controllers to each other in a mutually communicable manner, and it transmits a data signal and a control signal.

Figure 2:
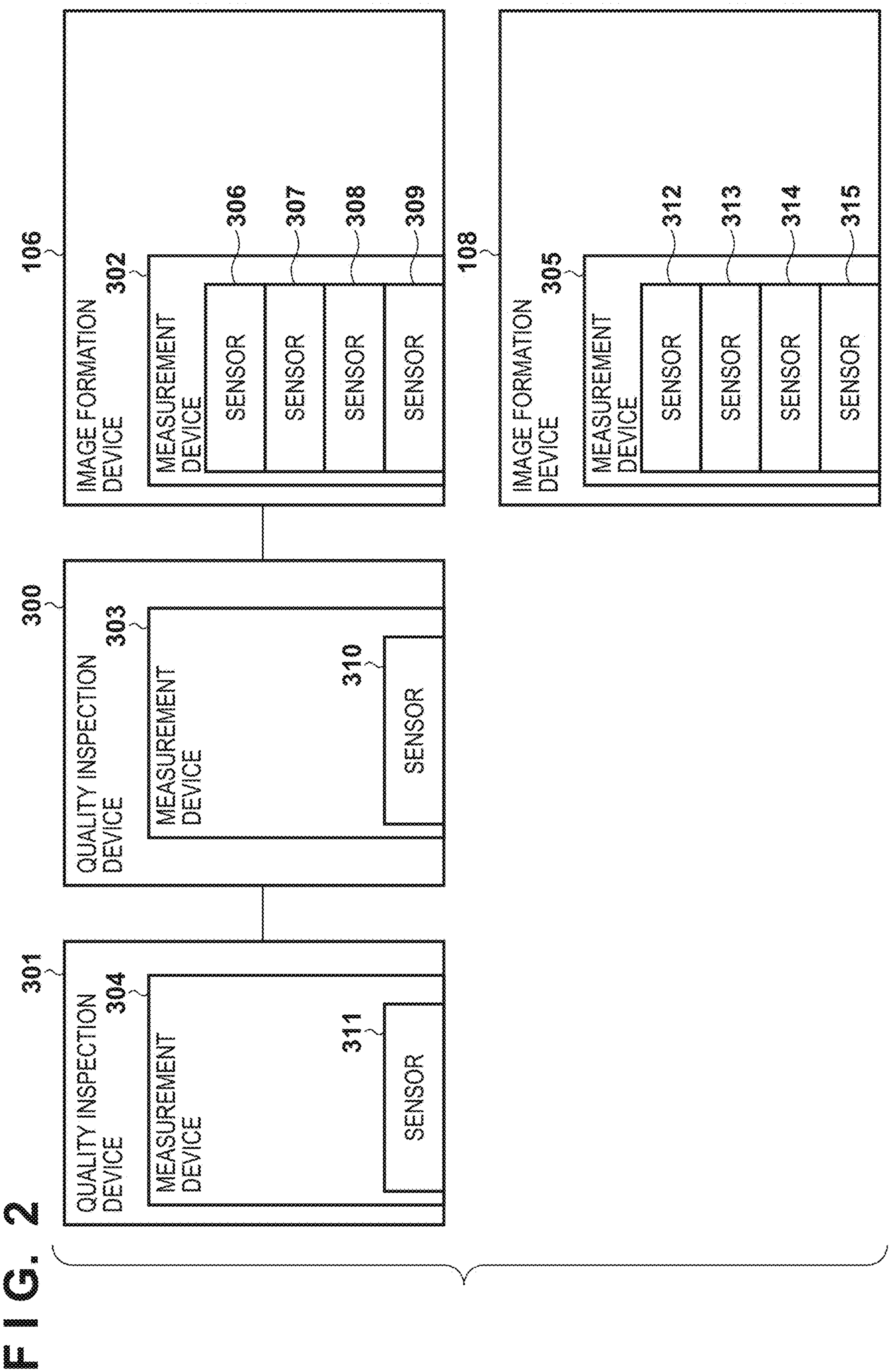
FIG. 2 is a diagram for describing a relationship between an image formation device and a quality inspection device.

In the present embodiment, description is made while assuming that the information processing devices 102, 104, and 107 include the configuration illustrated in FIG. 2. However, a block that can be executed may be included as appropriate according to a device to which each device is applied. For example, when a mobile phone is applied, a touch panel controller or the like is configured. A large-capacity storage device may be included in place of the HDD 210. Moreover, the internal configuration of the network controller 212 varies depending on whether the network to be connected is a wired LAN, a wireless LAN, or both. However, the differences of the internal configuration are concealed within the network controller 212, and the network controller 212 is configured to control the system equivalently for other modules illustrated in FIG. 2.

FIG. 2 is a diagram for describing a relationship between an image formation device and a quality inspection device. In the present embodiment, functions of the quality inspection device, such as color measurement and adjustment of color consistency can be added to the image formation device. There are a plurality of methods of adding the functions of the quality inspection device to the image formation device. In one method, the functions of the quality inspection device are added by embedding the quality inspection device in the image formation device. In one method, the functions of the quality inspection device are added by externally mounting the quality inspection device to the image formation device.

A measurement device 302 is a quality inspection device embedded in a transport path of paper (one example of a printing medium) in the image formation device 106, and is an inline sensor, for example. The measurement device 302 includes a plurality of sensors 306 to 309. A measurement device 305 is a quality inspection device embedded in a transport path of paper in the image formation device 108, and is an inline sensor, for example. The measurement device 305 includes a plurality of sensors 312 to 315.

A quality inspection device 300 is a quality inspection device that can be externally mounted to the image formation device 106, and it is a sensing unit including a color measurement function, a misregistration correction function, and a color consistency adjustment function, for example. The quality inspection device 300 includes a sensor 310 inside a measurement device 303. A quality inspection device 301 is a quality inspection device that can be externally mounted to the image formation device 106 or the quality inspection device 300, and is an inspection unit including an inspection function, for example. The quality inspection device 301 includes a sensor 311 inside a measurement device 304. Note that the measurement devices 302 and 305 may include a single sensor, and the measurement devices 303 and 304 may include a plurality of sensors.

The embedded quality inspection device and the externally-mounted quality inspection device include different quality inspection functions, and a user can add the inspection detection device according to a required task. A user is required to select a quality inspection device as appropriate according to desired quality inspection work. Note that, in FIG. 2, an example in which the externally-mounted quality inspection device is not mounted to the image formation device 108 is illustrated. However, the externally-mounted quality inspection device may be mounted.

Figure 3A:
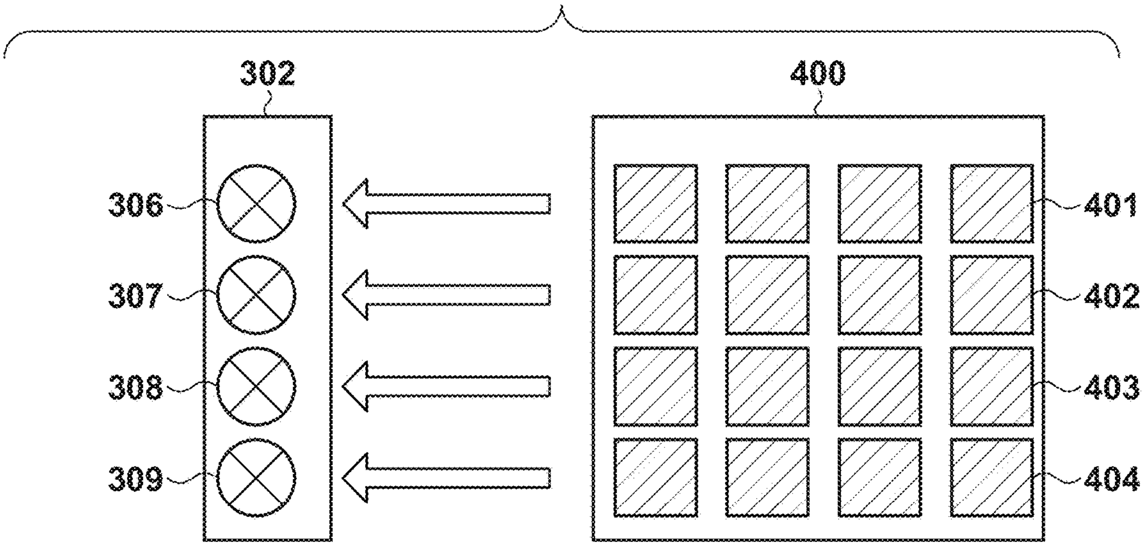
FIG. 3A and FIG. 3B are diagrams for describing a relationship between a color chart and a measurement device.
Figure 3B:
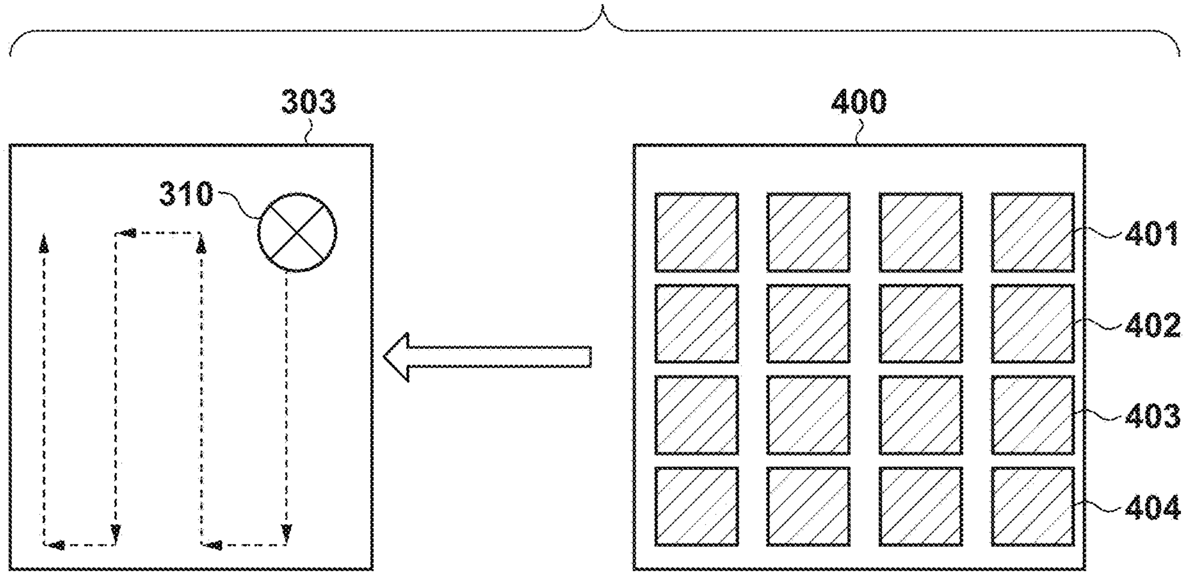

FIG. 3A and FIG. 3B are diagrams for describing a relationship between a color chart and a measurement device. FIG. 3A illustrates a relationship between a measurement device in the embedded quality inspection device and a color chart. A color chart 400 includes four color strips 401 to 404. The measurement device 302 includes the four sensors 306 to 309. In the present embodiment, in a case of the embedded quality inspection device, the sensors are installed in the paper transport path in a fixed manner. When the color chart 400 is transported downstream inside the image formation device 106, the sensors 306 to 309 that are fixed inside the measurement device 302 of the image formation device 106 read the color strips at the corresponding positions while the color chart 400 is printed and transported downward. For example, the sensor 306 reads the color strip 401.

FIG. 3B illustrates a relationship between a measurement device in the externally-mounted quality inspection device and a color chart. The measurement device 303 of the quality inspection device 300 includes the variable sensor 310. The color strips 401 to 404 are printed by the image formation device 106 and are taken into the quality inspection device 300. Then, the measurement device 303 reads the color strips of the color chart 400 while moving the sensor 310 in the horizontal direction with respect to the paper transport direction. In general, color measurement can be performed faster by reading a color chart with four sensors than with one sensor. Meanwhile, in a case of four sensors, color measurement accuracy varies individually for each sensor. Thus, when accurate color measurement is performed in consideration of on-surface unevenness, a quality inspection device including one sensor is selected.

Figure 4:
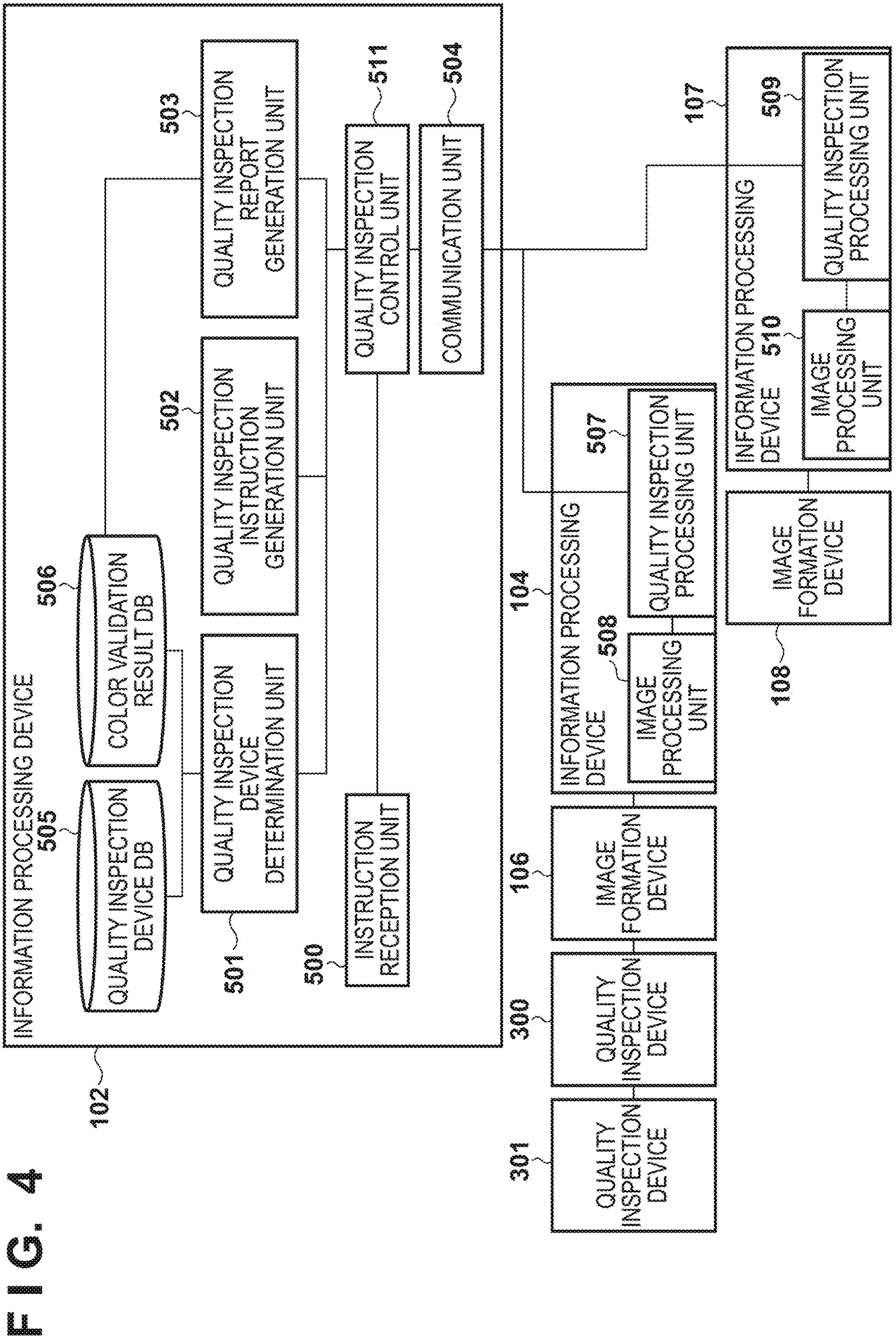
FIG. 4 is a diagram illustrating a functional block configuration of a quality inspection system.

FIG. 4 is a diagram illustrating one example of a functional block configuration of the quality inspection system illustrated in FIG. 1A. The information processing device 102 includes an instruction reception unit 500, a quality inspection device determination unit 501, a quality inspection instruction generation unit 502, a quality inspection report generation unit 503, a communication unit 504, a quality inspection device database (DB) 505, a color validation result database (DB) 506, and a quality inspection control unit 511.

The instruction reception unit 500 receives an instruction of quality inspection from a user. The quality inspection device determination unit 501 determines a quality inspection device for executing quality inspection, based on input data being input from a user with the instruction reception unit 500. The quality inspection instruction generation unit 502 generates a quality inspection instruction for instructing the quality inspection processing units 507 and 509.

The quality inspection report generation unit 503 generates a quality inspection report, based on quality inspection results transmitted from the quality inspection processing units 507 and 509 of the printing services system 103. The communication unit 504 executes processing of communication with the quality inspection processing units 507 and 509 for transmitting and receiving the quality inspection instructions and the quality inspection results.

The quality inspection device database 505 stores information relating to the functions of the quality inspection devices. The color validation result database 506 stores the quality inspection results that are received by the quality inspection control unit 511 from the quality inspection processing units 507 and 509. In the present embodiment, description is made on color validation as one example of quality inspection. Thus, a color validation result is stored. The quality inspection control unit 511 executes control for the entire processing in the quality inspection system, mainly focusing on the following three points.

For the first point, the quality inspection control unit 511 acquires information relating to a quality inspection device that can be used in the quality inspection system, from the quality inspection processing units 507 and 509. For example, in a case of the embedded quality inspection device, the quality inspection control unit 511 acquires information relating to the measurement device inside the image formation device. For another point, when an instruction of quality inspection is received from the instruction reception unit 500, the quality inspection control unit 511 causes the quality inspection device determination unit 501 to determine a quality inspection device, causes the quality inspection instruction generation unit 502 to generate a quality inspection instruction, and then transmits the generated quality inspection instruction to the specified information processing device. For the other point, when quality inspection results are received from the quality inspection processing units 507 and 509, the quality inspection control unit 511 causes the quality inspection report generation unit 503 to generate a quality inspection report, and displays a screen, based on the generated quality inspection report.

The information processing device 104 includes the quality inspection processing unit 507 and an image processing unit 508, and the information processing device 107 includes the quality inspection processing unit 509 and an image processing unit 510. When a quality inspection instruction is received from the information processing device 102, the quality inspection processing units 507 and 509 execute control for causing the specified quality inspection device to execute quality inspection. When the quality inspection device completes the processing, the processing result is transmitted as the quality inspection result to the quality inspection control unit 511 via the communication unit 504 of the information processing device 102. The image processing units 508 and 510 convert printing data into image data and transmit the data to the image formation devices 106 and 108. The data conversion includes color space conversion, for example.

FIG. 5A is a diagram illustrating one example of the quality inspection device database 505. A column 601 indicates quality inspection devices registered in the quality inspection device database 505. For example, in FIG. 5A, an inline sensor, a sensing unit, and an inspection unit are illustrated. A row 602 indicates functions of quality inspection. For example, FIG. 5A illustrates, as the respective functions of color validation, spectral color measurement (high-speed, high-quality), concentration analysis, registration adjustment, inspection, engine calibration, and media calibration. In the quality inspection device database 505, whether each of the functions in the row 602 can be executed is defined for each of the quality inspection devices in the column 601. Note that the quality inspection device database 505 may be prepared in advance as a static database in the quality inspection system, or it may be generated or updated as a result of acquiring a mounting state of the quality inspection device or acquiring ability information relating to each quality inspection device by processing in a flowchart described above.

FIG. 5B is a diagram illustrating one example of a color validation setting screen displayed by the information processing device 102. A color validation setting screen 700 in FIG. 5B is a screen displayed after color validation is selected in the menu 1502 of the quality inspection test selection screen 1500 in FIG. 13. The color validation setting screen 700 is a screen that is displayed by the instruction reception unit 500 and receives selection of a quality inspection device used for color validation from a used in the above-mentioned second step.

A display region 701 indicates the above-mentioned respective steps for color validation. In the present embodiment, a color validation test is selected in the first step. Further, color validation is executed in the order of the second step in which a measurement device as a quality inspection device is selected, the third step in which patch color measurement is executed as quality inspection, and the fourth step in which color measurement is completed.

A button 702 is a button for receiving an instruction of starting color measurement in the color validation test. When the button 702 is pressed down, a screen (omitted in illustration) corresponding to the third step subsequent thereto is displayed.

Figure 6:
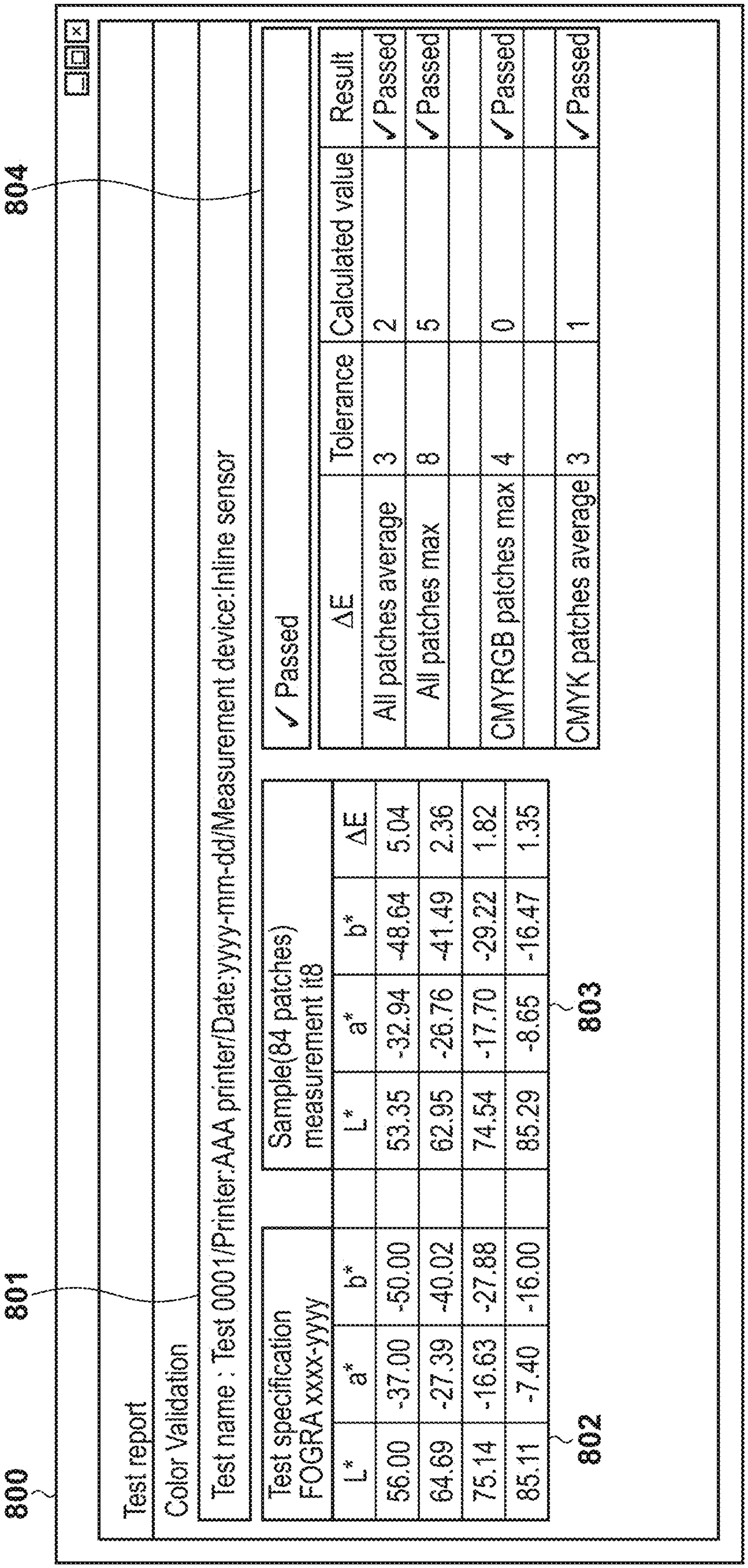
FIG. 6 is a diagram illustrating a user interface screen.

Note that, when color measurement for color validation is finished, a color validation result report in FIG. 6 is displayed. A drop down 703 receives an instruction indicating accuracy of color measurement for color validation that is desired by a user. For example, when a user does not allow on-surface unevenness of color measurement, a high quality level is set. In the present embodiment, for example, selection can be made from three options including High level, Mid level, and Low level, and description is made on a case where High level is selected, in other words, a user does not allow on-surface unevenness of color measurement. Note that the options are not limited to the example in FIG. 5B, and it may include options to address on-surface unevenness reduction, a plurality of measurements on the same patch, and other related functionalities.

A drop down 704 displays a selectable quality inspection device that can execute quality inspection at accuracy (criteria) selected with the drop down 703. The drop down 704 displays a list of quality inspection devices that are mounted to or embedded in the image formation device. When a manual measurement device is mounted to the image formation device, the measurement device may be displayed. When there are a plurality of quality inspection devices that can execute quality inspection based on the criteria selected with the drop down 703, a list of those quality inspection devices is displayed in a selectable manner. When there is only one quality inspection device, only the quality inspection device is displayed.

FIG. 6 is a diagram illustrating one example of a color validation result screen displayed by the information processing device 102. The color validation result screen 800 includes display regions 801, 802, 803, and 804. The color validation result screen 800 is displayed based on the quality inspection report generated by the quality inspection report generation unit 503.

The display region 801 displays information relating to color validation. For example, a test name, a name of an image formation device, an execution date/time of color validation, a used quality inspection device, and the like are displayed. The display region 802 displays a Lab (expected value) of the inspection criteria used for color validation. The display region 803 displays a Lab value (measured value) of the color chart measured for color validation. A difference acquired by comparing the respective rows of the display region 802 and the display region 803 with each other is displayed in a ΔE column. As the value ΔE is smaller, the difference between the expected value and the measured value is small, that is, a more satisfactory result is acquired.

The display region 804 indicates a color validation result, and any one Passed and Failed is displayed, for example. For example, when Failed is displayed, the image formation device is in a state in which printing with color consistency desired by a user cannot be performed. In this case, a user performs maintenance work such as calibration of the image formation device and adjustment of color settings.

FIG. 7A to FIG. 7B are diagrams illustrating one example of data communicated between the web system 101 and the printing services system 103 when quality inspection is executed. In the present embodiment, as one example the data, description is made on a Job Definition Format (JDF) established by CIP4 being a standardizing body of commercial printing. CIP4 is an abbreviation for the International Cooperation for the Integration of Processes in Prepress, Press and Postpress Organization.

FIG. 7A illustrates one example of a JDF indicating a quality inspection instruction transmitted from the web system 101 to the printing services system 103. In a JDF 900, information 902 specifies an image formation device to be used for quality inspection. In this example, the image formation device 106 is specified. Note that a device such as a post-processing device other than the image formation device may be specified. When the quality inspection device is a device independent from the image formation device, that is, a device other than an option device for the image formation device, the quality inspection device itself may be specified.

Information 903 specifies quality inspection being an execution target. In this example, colorimetry indicating color measurement is specified. In addition, misregistration correction or quality inspection such as concentration inspection and image inspection may be specified. Information 904 specifies printing data of a color chart being a measurement target. In this example, the image formation device 106 uses printing data specified by a pass in the information 904. Information 905 specifies a quality inspection device to be used for color validation. When a quality inspection device that is optionally mounted to the image formation device is specified, the information 905 is specified. For example, when the measurement device 302 embedded in the image formation device 106 in FIG. 2 is used, an ID of the measurement device 302 is specified in the information 905.

FIG. 7B illustrates one example of a JDF indicating a quality inspection result transmitted from the printing services system 103 to the web system 101. In a JDF 901, information 906 describes the image formation device used for quality inspection. Information 907 describes quality inspection being executed. Information 908 describes the quality inspection device used for quality inspection. Information 909 describes the color measurement result of color measurement for color validation.

FIG. 7C illustrates one example request data for acquiring the mounting state of the quality inspection device that is transmitted from the web system 101 to the printing services system 103. In the present embodiment, as one example the data, description is made on a Job Messaging Format (JMF) established by CIP4 being a standardizing body of commercial printing.

FIG. 7D illustrates one example of response data that is transmitted from the printing services system 103 to the web system 101 according to a JMF 910. In A JMF 911, information 912 describes information relating to the device that processes the JMF 910. For example, an ID of the image formation device 106 is described. Information 913 describes an ID of the quality inspection device mounted to the image formation device 106. Information 914 describes an URL indicating a storage location of a help file of the quality inspection device mounted to the image formation device 106.

Figure 8:
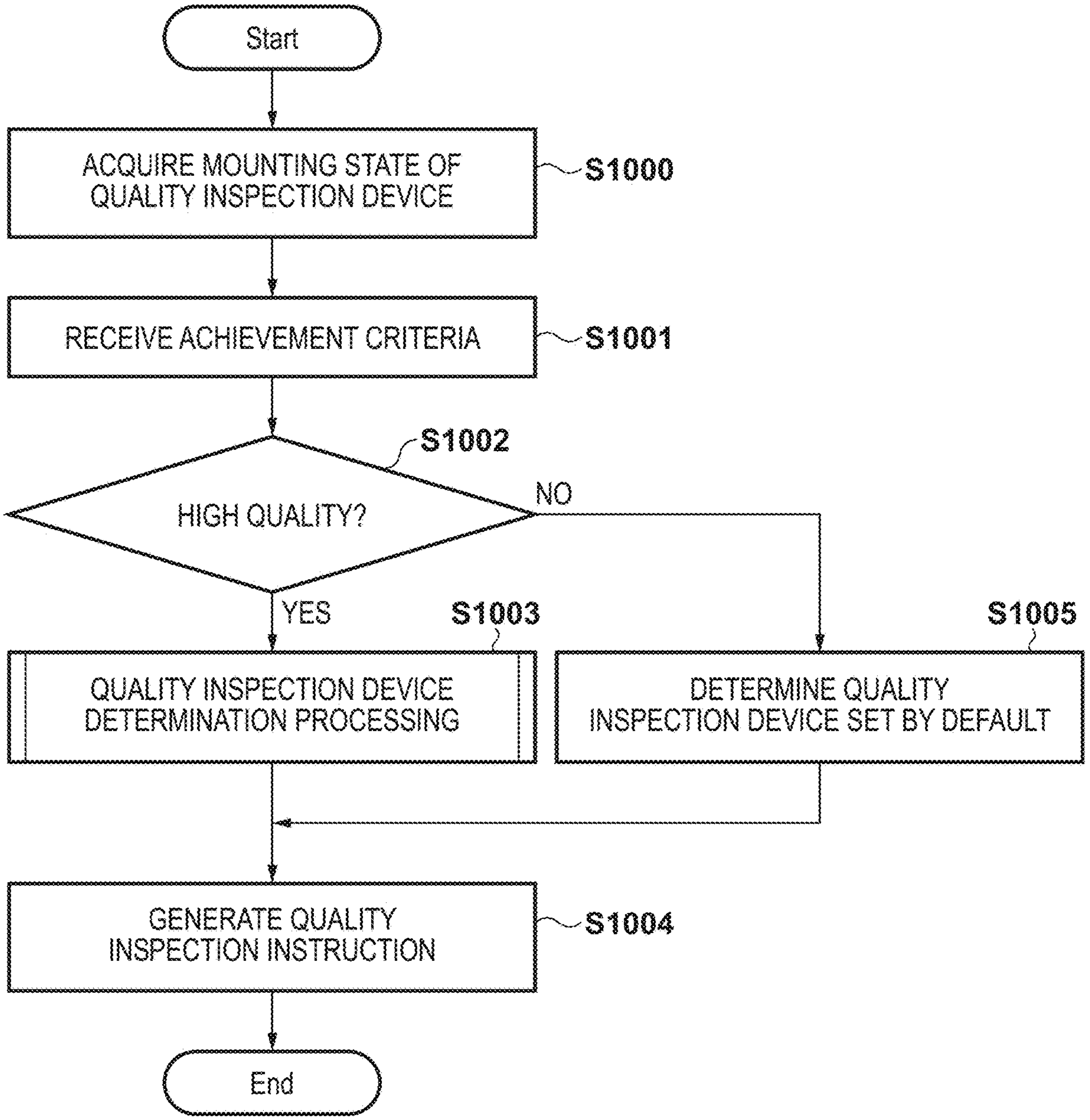
FIG. 8 is a flowchart illustrating processing of determining a quality inspection device.

FIG. 8 is a flowchart illustrating processing of determining a quality inspection device in the information processing device 102. The processing in FIG. 8 is realized by the CPU 201 of the information processing device 102, for example, reading a program stored in the ROM 203 to the RAM 202 and executing the same.

In S1000, the CPU 201 causes the quality inspection control unit 511 to acquire the mounting state of the quality inspection device. The quality inspection control unit 511 transmits the JMF 910 in FIG. 7C to the information processing devices 104 and 107 via the communication unit 504. The quality inspection processing unit 507 of the information processing device 104 receives the JMF 910 and then communicates with the image formation device 106 to collect the mounting state of the quality inspection device. Further, the quality inspection processing unit 507 generates the JMF 911 in FIG. 7D and then transmits the same to the quality inspection control unit 511. The same holds true for the information processing device 107. In other words, the quality inspection processing unit 509 of the information processing device 107 receives the JMF 910 and then communicates with the image formation device 108 to collect the mounting state of the quality inspection device. Further, the quality inspection processing unit 509 generates the JMF 911 in FIG. 7D to transmit the same to the quality inspection control unit 511.

The present processing may be executed at timing at which the image formation device is registered in the quality inspection system, or it may be executed periodically after registration of the image formation device. Alternatively, the present processing may be executed according to an instruction of a user.

In S1001, the CPU 201 causes the instruction reception unit 500 to receive the criteria from a user. For example, when the criteria 703 in FIG. 5B is selected, the criteria are received. In S1002, the CPU 201 causes the quality inspection device determination unit 501 to determine whether the inspection result is high quality in terms of the quality criteria. For example, when High is selected for the criteria 703 in FIG. 5B, it is determined that the inspection result is high quality. When it is determined that the inspection result is high quality, the processing proceeds to S1003. When it is determined that the inspection result is not high quality, the processing proceeds to S1005.

In S1003, the CPU 201 causes the quality inspection device determination unit 501 to execute quality inspection device determination processing, which is described later with reference to FIG. 9. In S1005, the CPU 201 causes the quality inspection device determination unit 501 to determine a quality inspection device (default quality inspection device), which is set in advance in the quality inspection system, as the quality inspection device to be used for quality inspection. The default quality inspection device may be determined at the time of acquisition of the mounting state of the quality inspection device, or it may be determined by a user on a setting screen or the like.

In S1004, the CPU 201 causes the quality inspection instruction generation unit 502 to generate the quality inspection instruction, based on the quality inspection device determined by the quality inspection device determination unit 501. The JDF file 900 in FIG. 7A corresponds to the quality inspection instruction being generated herein. After S1004, FIG. 8 is finished.

Figure 9:
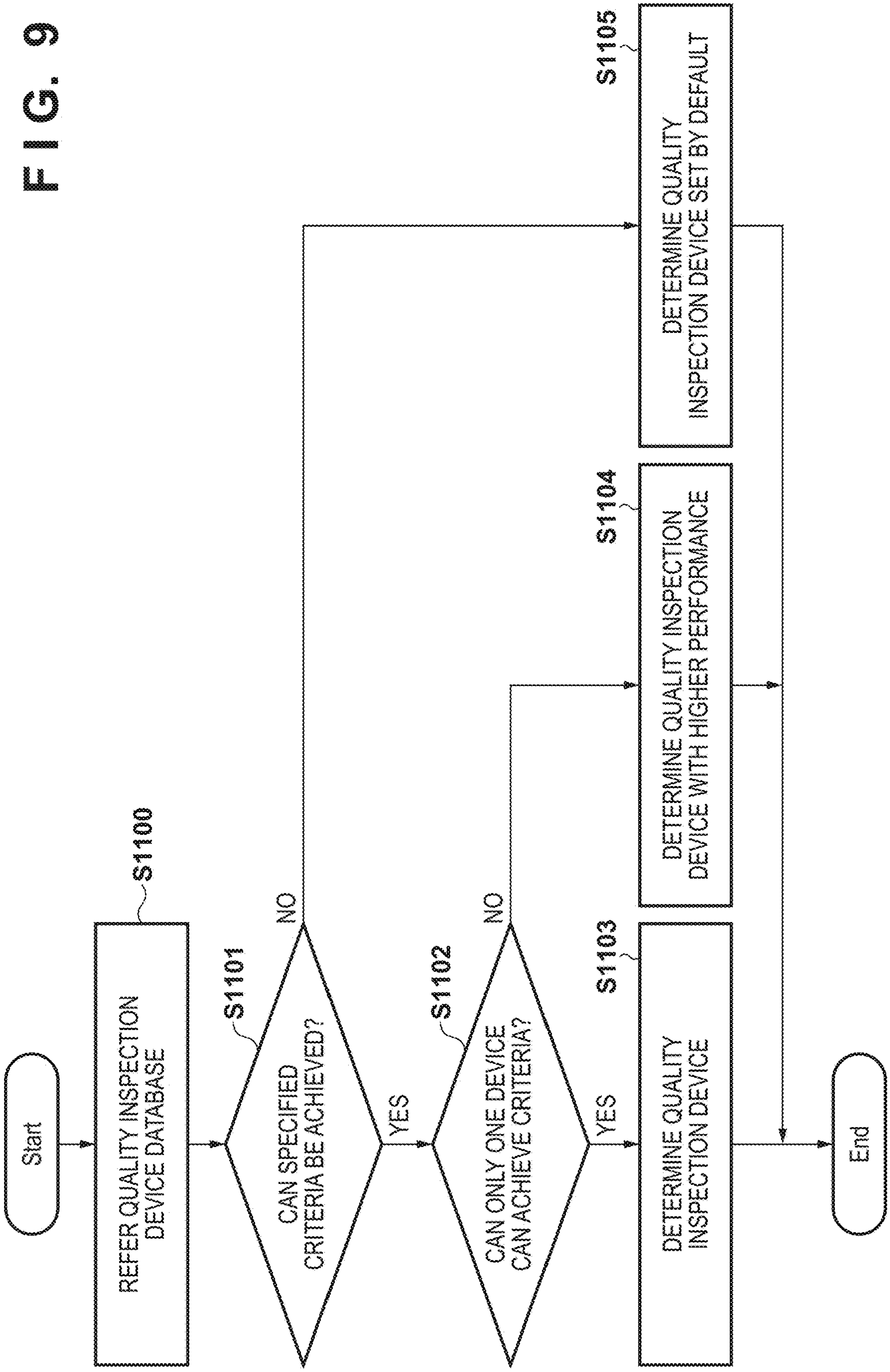
FIG. 9 is a flowchart illustrating processing of determining a quality inspection device.

FIG. 9 is a flowchart illustrating the processing in S1003. Herein, it is assumed that a user selects High as the criteria 703 in FIG. 5B for the purpose of reducing on-surface unevenness at the time of measurement.

In S1100, the CPU 201 causes the quality inspection device determination unit 501 to refer to the quality inspection device database 505 and specify a quality inspection device that can execute quality inspection to be currently executed based on the quality criteria. For example, a setting is performed by using the color validation setting screen 700 in FIG. 5B, and hence quality inspection to be currently executed is color validation (color measurement). Therefore, in FIG. 5A, as quality inspection devices that can execute color validation, two devices including an inline sensor and a sensing unit are specified.

In S1101, the CPU 201 causes the quality inspection device determination unit 501 to determine whether the two quality inspection devices specified in S1100 satisfy the quality criteria selected by a user by using the criteria 703 in FIG. 5B. Herein, the sensing unit that supports High Quality is the only device that can execute measurement in consideration of on-surface unevenness. Thus, the quality inspection device determination unit 501 determines that the quality criteria selected by using the criteria 703 can be satisfied. When it is determined that the quality criteria can be satisfied in S1101, the processing proceeds to S1102.

When it is determined that the quality criteria cannot be satisfied in S1101, the processing proceeds to S1105.

In S1102, the CPU 201 causes the quality inspection device determination unit 501 to determine whether only one quality inspection device is determined as the device satisfying the quality criteria. When it is determined that there is only one quality inspection device, the processing proceeds to S1103. When it is determined that there are a plurality of quality inspection devices, the processing proceeds to S1104.

In S1103, the CPU 201 causes the quality inspection device determination unit 501 to the quality inspection device as the quality inspection device to be displayed as a selection candidate. The quality inspection device being determined herein is displayed in the drop down 704. Then, the processing in FIG. 9 is finished.

In S1104, the CPU 201 causes the quality inspection device determination unit 501 to determine a quality inspection device with higher performance among a plurality of quality inspection devices, as the quality inspection device to be displayed as a selection candidate. For example, a quality inspection device equipped with a highly accurate sensor is preferentially determined as the quality inspection device to be displayed as a selection candidate. The quality inspection device being determined herein is displayed in the drop down 704. Then, the processing in FIG. 9 is finished.

In S1105, the CPU 201 causes the quality inspection device determination unit 501 to determine a quality inspection device (default quality inspection device), which is set in advance in the quality inspection system, as the quality inspection device to be displayed as a selection candidate. The default quality inspection device may be determined at the time of acquisition of the mounting state of the quality inspection device, or it may be determined by a user on a setting screen or the like. The quality inspection device being determined herein is displayed in the drop down 704. Then, the processing in FIG. 9 is finished.

Figure 10:
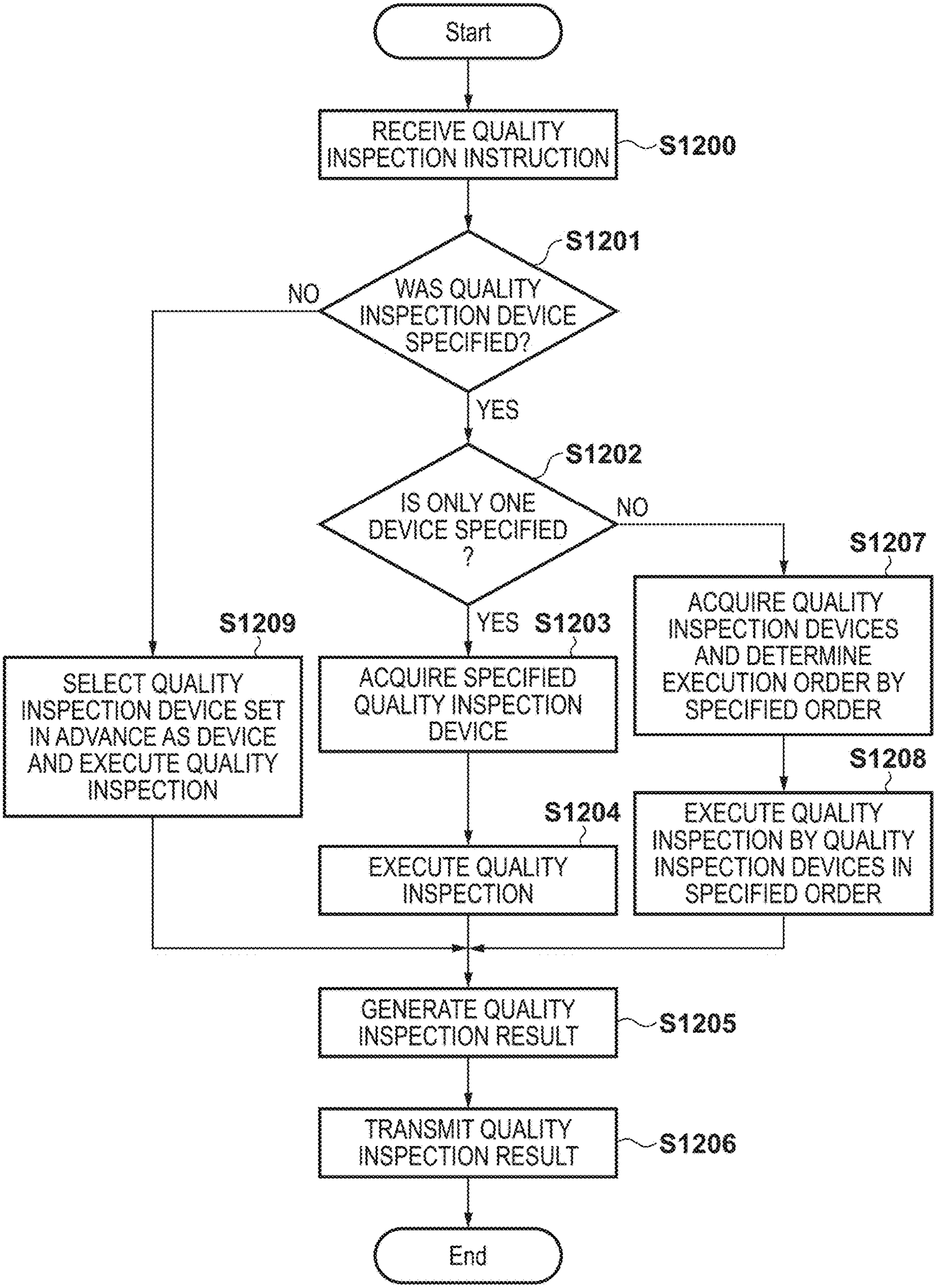
FIG. 10 is a flowchart illustrating processing in a printing services system.

FIG. 10 is a flowchart illustrating processing of executing quality inspection in the printing services system 103. The processing in FIG. 10 may be executed in both the information processing device 104 and the information processing device 107. As a representative example, description is made below while assuming that the processing is executed in the information processing device 104. In other words, description is made while assuming that quality inspection is executed with respect to the image formation device 106.

The processing in FIG. 10 is realized by the CPU 201 of the information processing device 104, for example, reading a program stored in the ROM 203 to the RAM 202 and executing the same.

In S1200, the CPU 201 causes the quality inspection processing unit 507 to receive the quality inspection instruction from the quality inspection control unit 511 of the web system 101 via the communication unit 504. For example, the JDF 900 in FIG. 7A corresponds to the quality inspection instruction herein.

In S1201, the CPU 201 causes the quality inspection processing unit 507 to determine whether the received quality inspection instruction specifies a quality inspection device. For example, the CPU 201 determines whether the JDF 900 in FIG. 7A includes a Module element of the information 905.

When it is determined that the quality inspection device is specified, the processing proceeds to S1202. When it is determined that the quality inspection device is not specified, the processing proceeds to S1209.

In S1202, the CPU 201 causes the quality inspection processing unit 507 to determine whether there is only one quality inspection device specified in the quality inspection instruction. When it is determined that there is only one quality inspection device, the processing proceeds to S1203. When it is determined that there are a plurality of quality inspection devices, the processing proceeds to S1207.

In S1203, the CPU 201 causes the quality inspection processing unit 507 to determine the specified quality inspection device as the device for executing quality inspection. In S1204, the CPU 201 causes the quality inspection processing unit 507 to execute quality inspection by using the quality inspection device determined in S1203.

In S1205, the CPU 201 causes the quality inspection processing unit 507 to generate the quality inspection result, based on the acquired inspection data as a result of executing quality inspection. For example, the CPU 201 generates the JDF 901 in FIG. 7B. In S1206, the CPU 201 causes the quality inspection processing unit 507 to transmit the quality inspection result generated in S1205 to the quality inspection control unit 511. Then, the processing in FIG. 10 is finished.

In S1207, the CPU 201 causes the quality inspection processing unit 507 to acquire information relating to the plurality of inspection devices listed in the quality inspection instruction and determine the execution order of quality inspection in the listed order in the quality inspection instruction. For example, in a case of the quality inspection instruction 2300 in FIG. 20A, which is described later, the execution order of quality inspection is determined in the order of a quality inspection device 2302 and a quality inspection device 2303. In S1208, the CPU 201 causes the quality inspection processing unit 507 to control each quality inspection device according to the execution order and the quality inspection devices that are determined in S1207 so that quality inspection is sequentially executed. After S1208, the processing proceeds to S1205 described above.

In S1209, the CPU 201 causes the quality inspection processing unit 507 to control the default quality inspection device that is set in advance so that quality inspection is executed. After S1209, the processing proceeds to S1205 described above.

Figures 11, 12:
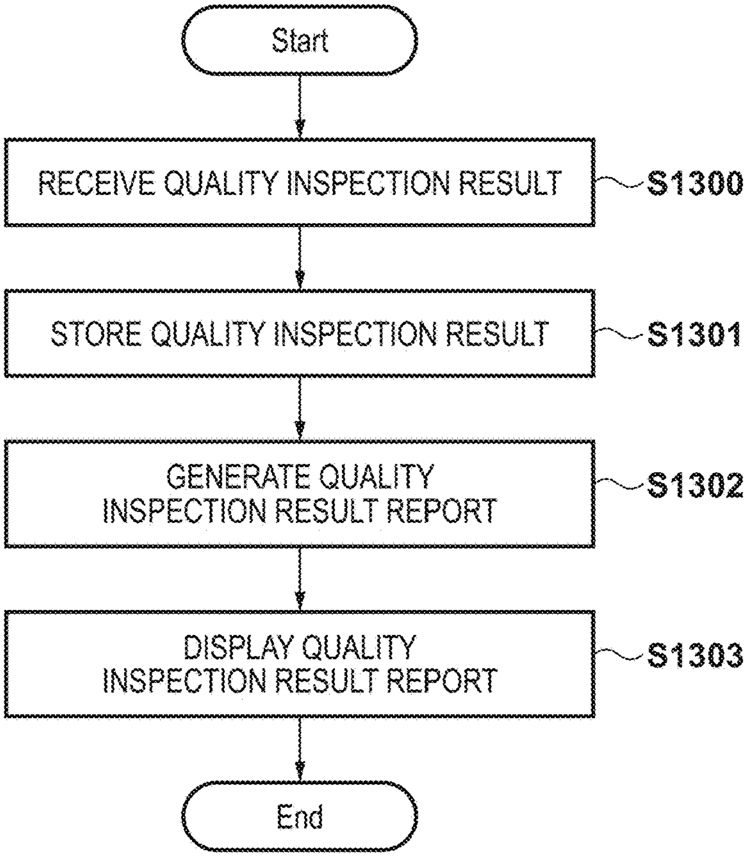
FIG. 11 is a flowchart illustrating processing of displaying a quality inspection result report.
FIG. 12 is a diagram illustrating a color verification result database.

FIG. 11 is a flowchart illustrating processing of displaying a quality inspection result report, which is executed in the web system 101 that receives the quality inspection result transmitted in S1206 in FIG. 10. The processing in FIG. 11 is realized by the CPU 201 of the information processing device 102, for example, reading a program stored in the ROM 203 to the RAM 202 and executing the same. Herein, as an example, description is made on a case where quality inspection is executed with respect to the image formation device 106.

In S1300, the CPU 201 causes the quality inspection control unit 511 to receive the quality inspection result from the quality inspection processing unit 507 via the communication unit 504. For example, the JDF 901 in FIG. 7B is received. The quality inspection control unit 511 sends the received quality inspection result to the quality inspection report generation unit 503.

In S1301, the CPU 201 causes the quality inspection report generation unit 503 to store the quality inspection result in the color validation result database 506. As a storage method, the quality inspection result may be stored as a file itself, or it may be stored in a table format.

FIG. 12 illustrates one example of the color validation result database 506 in a table format. A column 1401 in a database 1400 stores the identification information relating to the image formation device being a quality inspection target. A column 1402 stores the information relating to the quality inspection device used for quality inspection. A column 1403 stores the information indicating the inspection criteria used for quality inspection. Herein, as one example of the information indicating the criteria for color validation, FOGRA (The German Printing Industry Certification Association) and GRACOL (General Requirements for Applications in Commercial Offset Lithography) are stored. A column 1404 stores a test name of quality inspection. A column 1405 stores a starting time of color validation, and a column 1406 stores an ending time of color validation.

In S1302, the CPU 201 causes the quality inspection report generation unit 503 to generate the quality inspection report. For example, the quality inspection report being generated herein includes information relating to the color validation result screen 800 in FIG. 6.

In S1303, the CPU 201 causes the quality inspection report generation unit 503 to display, for example, the color validation result screen 800 in FIG. 6, based on the quality inspection report generated in S1302. Then, the processing in FIG. 11 is finished.

As described above, according to the present embodiment, when the quality inspection devices are mounted to the image formation device, the quality inspection device that satisfies the desired quality criteria selected by a user can be determined and can be presented to a user. Further, quality inspection can be executed by using the quality inspection device, and the quality inspection report can be displayed.

Second Embodiment

A second embodiment is described below, focusing on the differences from the first embodiment. In the present embodiment, it is assumed that, as quality criteria desired by a user, the user desires to use the same type of quality inspection device to eliminate a difference in color measurement capabilities among the image formation devices.

Figure 14:
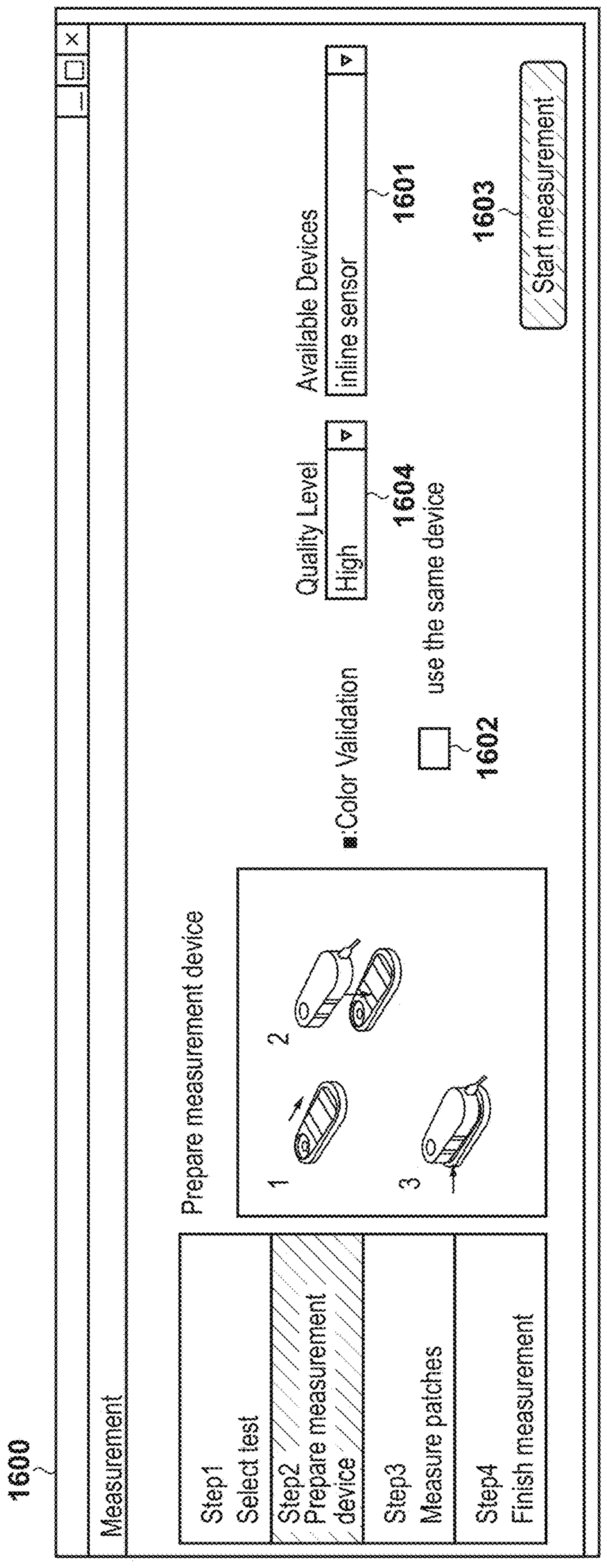
FIG. 14 is a diagram illustrating a user interface screen.

FIG. 14 is a diagram illustrating one example of a color validation setting screen displayed by the information processing device 102 in the present embodiment. A drop down 1604 and a button 1603 on a color validation setting screen 1600 are similar to the drop down 703 and the button 702 in FIG. 5B, and hence description therefor is omitted.

A check box 1602 is a check box for receiving an instruction indicating whether to use the same type of quality inspection device as color validation executed by the other image formation device. When the check box 1602 is selected, the quality inspection device determination processing, which is described later, is executed, and the determined quality inspection device is displayed in a drop down 1601. On the color validation setting screen 1600, when the check box 1602 is selected, the drop down 1604 may be displayed in gray so that a user operation is not accepted. The reason for this is because the quality criteria that a user desires to achieve for color validation differs between the drop down 1604 and the check box 1602.

Figure 15:
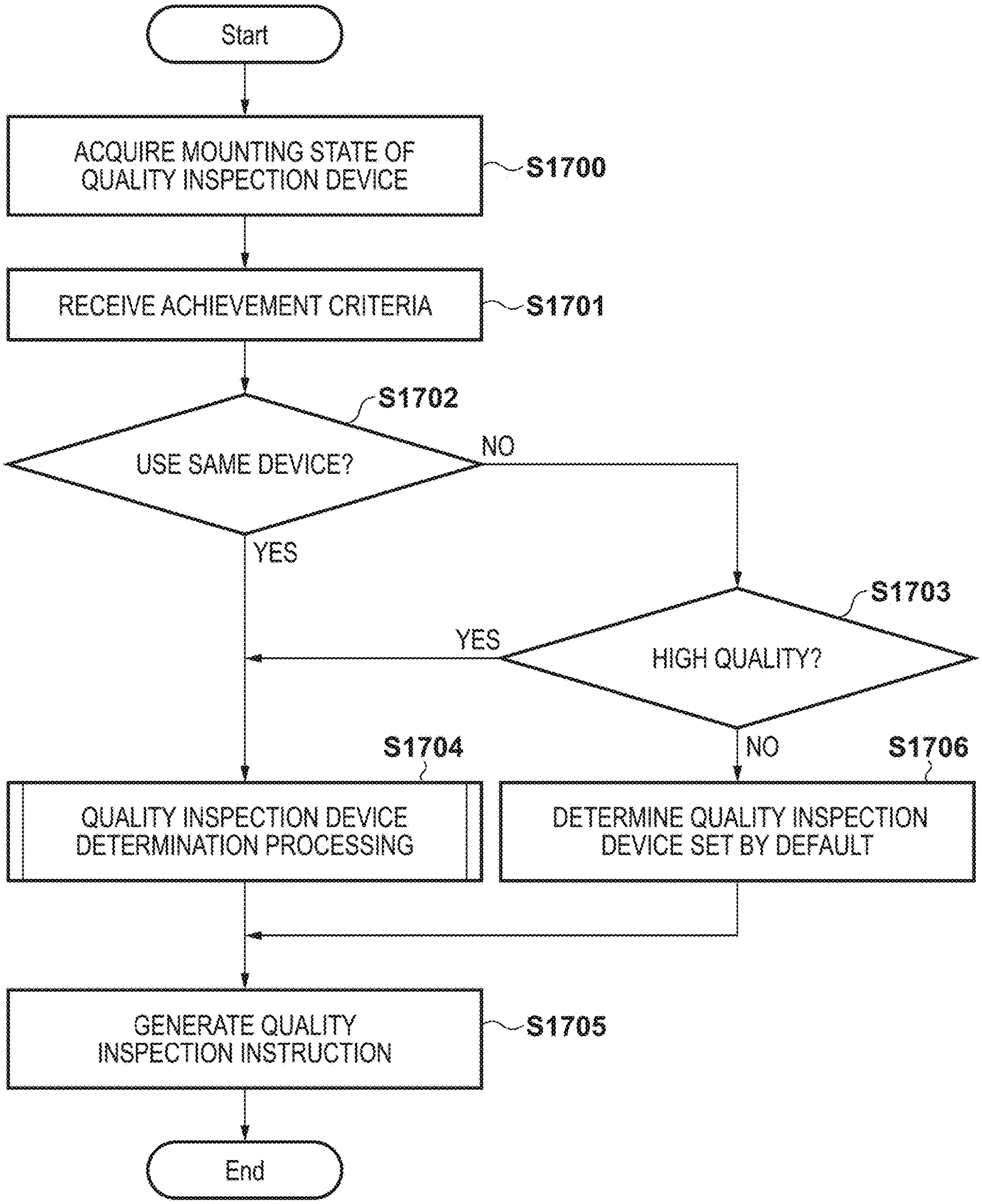
FIG. 15 is a flowchart illustrating processing of determining a quality inspection device.

FIG. 15 is a flowchart illustrating processing of determining a quality inspection device in the information processing device 102. The processing in FIG. 15 is realized by the CPU 201 of the information processing device 102, for example, reading a program stored in the ROM 203 to the RAM 202 and executing the same.

S1700 and S1701 are similar to S1000 and S1001 in FIG. 8, and hence description therefor is omitted.

In S1702, the CPU 201 causes the quality inspection device determination unit 501 to determine whether to use the same type of quality inspection device. For example, when the check box 1062 is selected in FIG. 14, it is determined that the same type of quality inspection device is used. When it is determined that the same type of quality inspection device is used, the processing proceeds to S1704. When it is determined that the same type of quality inspection device is not used, the processing proceeds to S1703. S1703, S1706, and S1705 are similar to S1002, S1005, and S1004 in FIG. 8, and hence description therefor is omitted.

Figure 16:
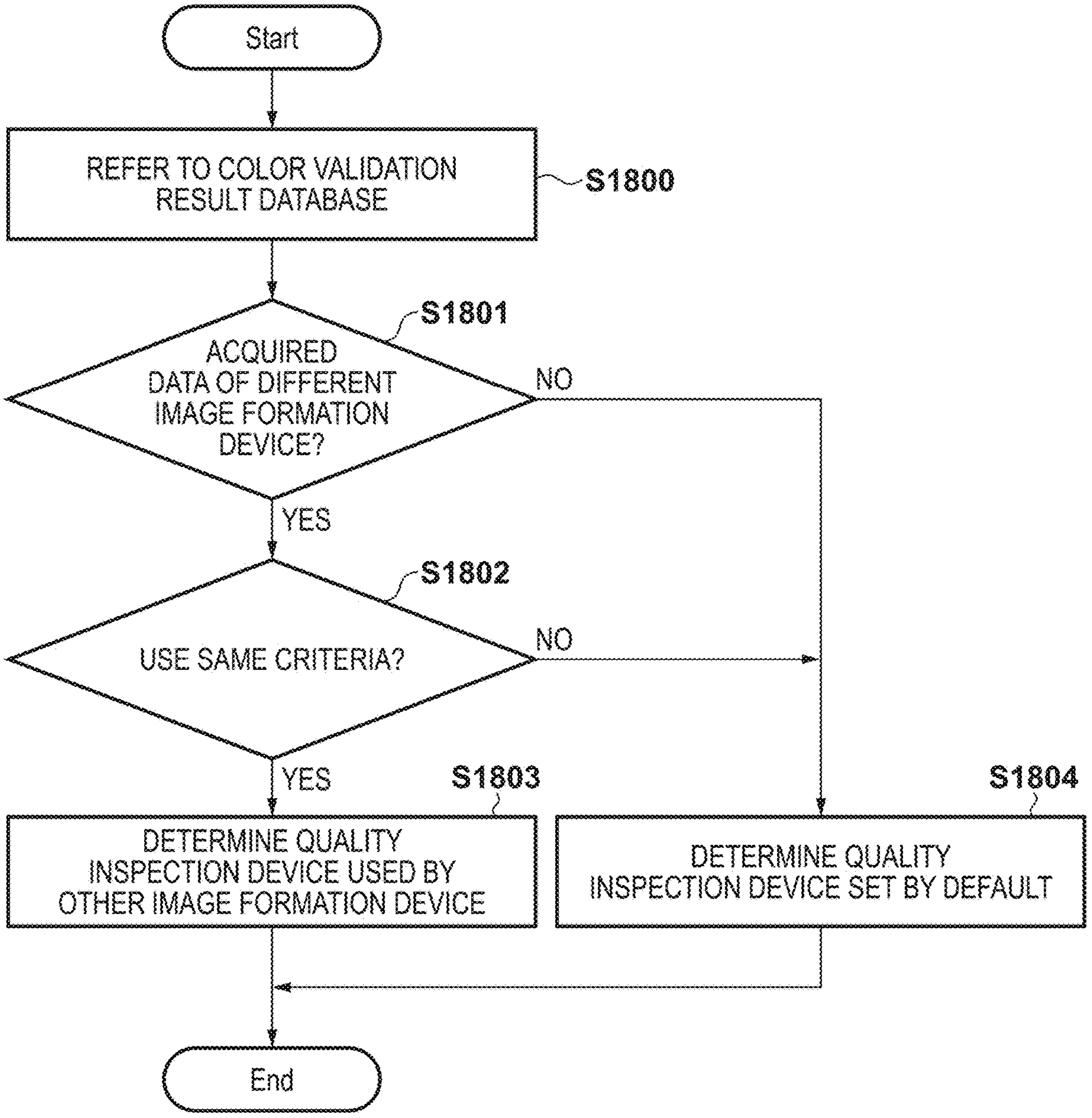
FIG. 16 is a flowchart illustrating processing of determining a quality inspection device.

When it is determined in S1702 that the same type of quality inspection device is used, the processing illustrated in FIG. 16 is executed in S1704 as the quality inspection device determination processing. Note that, when it is determined in S1702 that the same type of quality inspection device is not used, and when it is determined in S1703 that the quality criteria is high quality, the processing in FIG. 9 in S1704 as the quality inspection device determination processing.

FIG. 16 is a flowchart illustrating the processing in S1704. In S1800, the CPU 201 causes the quality inspection device determination unit 501 to refer to the color validation result database 506 and acquire data relating to the image formation device different from the image formation device for which a user desires execution of quality inspection. In other words, data relating to the image formation device different from the image formation device selected at a drop down 1501 of the quality inspection test selection screen 1500 in FIG. 13 is acquired. For example, when the image formation device that executes quality inspection is the image formation device 106, the data other than the image formation device 106, in other words, the data in the rows relating to "Printer 109" (the rows corresponding to an ID 3 and an ID 4) is acquired while referring to the column 1401 in FIG. 12.

In S1801, the CPU 201 causes the quality inspection device determination unit 501 to determine whether the data relating to the other image formation device can be acquired as a result of executing the processing in S1800. When it is determined that acquisition is succeeded, the processing proceeds to S1802. When it is determined that acquisition is not succeeded, the processing proceeds to S1804.

In S1802, the CPU 201 causes the quality inspection device determination unit 501 to refer to the color validation result database 506 and attempt to extract data using the same quality criteria from the acquired data relating to the other image formation device. For example, in FIG. 12, the data (the row corresponding to the ID 3) using the same criteria as the color validation criteria (FOGRA) of Printer 106 is extracted. When the data is extracted in S1802, the processing proceeds to S1803. When the data is not extracted, the processing proceeds to S1804.

In S1803, the CPU 201 causes the quality inspection device determination unit 501 to refer to the color validation result database 506 and determine the quality inspection device, which is described in the data extracted in S1802, as a selection candidate. For example, in FIG. 12, the inline sensor is used in the image formation device 108. Thus, for quality inspection of the image formation device 106, it is also judged that the inline sensor is used, and the inline sensor is determined as a selection candidate. The quality inspection device being determined herein is displayed in the drop down 1601. Then, the processing in FIG. 16 is finished.

In S1804, the CPU 201 causes the quality inspection device determination unit 501 to determine a quality inspection device (default quality inspection device), which is set in advance in the quality inspection system, as the quality inspection device to be displayed as a selection candidate. The default quality inspection device may be determined at the time of acquisition of the mounting state of the quality inspection device, or it may be determined by a user on a setting screen or the like. The quality inspection device being determined herein is displayed in the drop down 1601. Then, the processing in FIG. 16 is finished.

As described above, according to the present embodiment, the same type of quality inspection device as the quality inspection device in the other image formation device for which quality inspection is executed can be displayed as a selection candidate.

Third Embodiment

The differences from the first and second embodiments are described below. In the first embodiment and the second embodiment, description is made on a case where the quality inspection device to be used for quality inspection is determined on the web system 101 side and quality inspection is executed. In the present embodiment, description is made on the quality inspection device determination processing in a case where the quality inspection device to be used for quality inspection is defined in advance on the printing services system 103 side. Description is made below on the information processing device 104 and the image formation device 106 as one example.

Figure 17A:
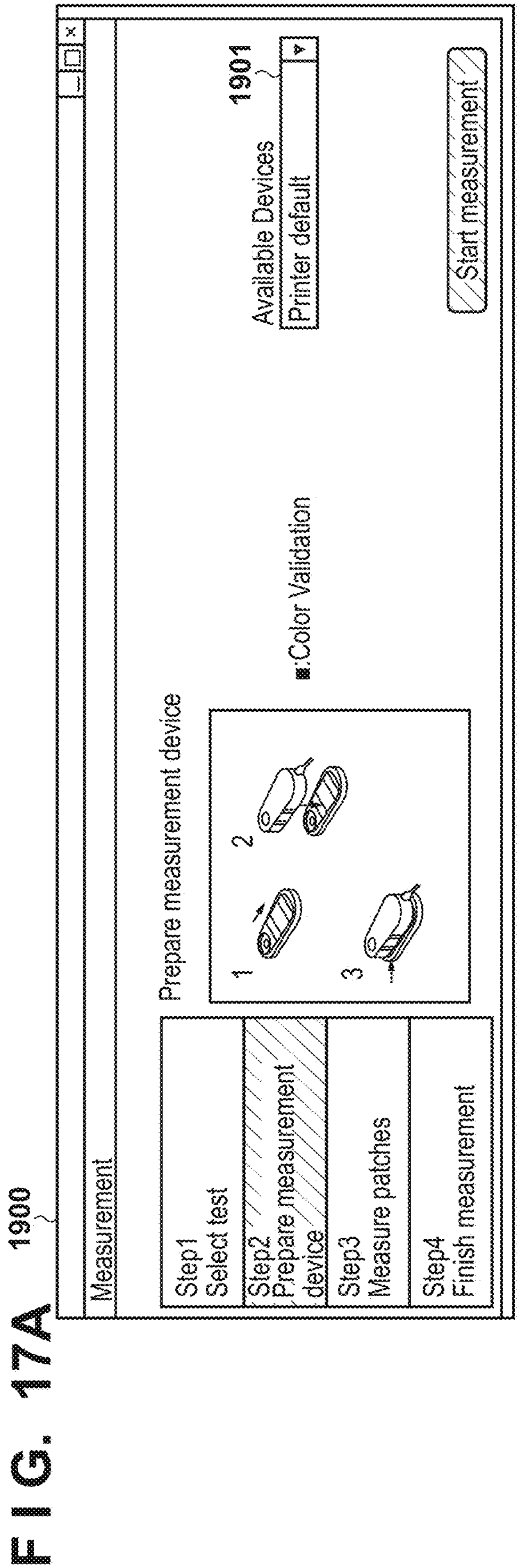
FIG. 17A and FIG. 17B are diagrams illustrating a user interface screen.

FIG. 17A is a diagram illustrating one example of a color validation setting screen displayed by the information processing device 102 when the quality inspection device to be used for quality inspection is defined in advance on the printing services system 103 side. A drop down 1901 on a color validation setting screen 1900 displays a selectable quality inspection device. When a user selects "Printer Default" with the drop down 1901, a quality inspection instruction of executing quality inspection by using the quality inspection device that is defined in advance on the printing services system 103 side is generated.

Figure 18A:
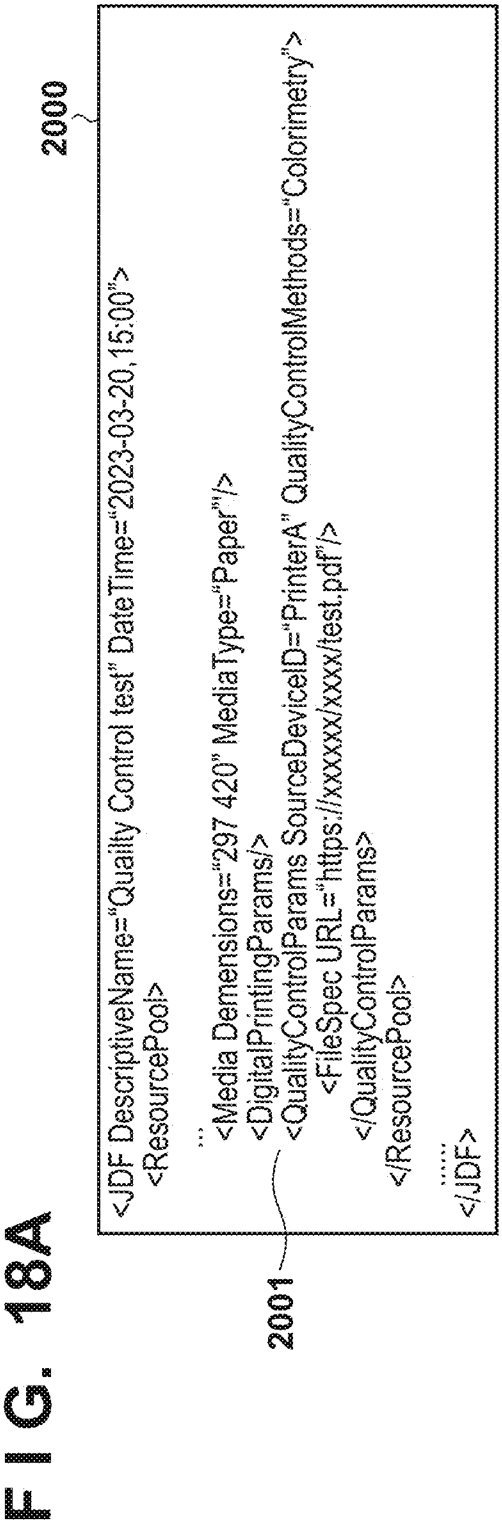
FIG. 18A to FIG. 18D are diagrams illustrating communication data and a user interface screen.

FIG. 18A is a diagram illustrating one example of the quality inspection instruction generated when a user selects "Printer Default". Unlike the JDF 900 in FIG. 7A, a JDF 2000 does not specify a quality inspection device in information 2001 while specifying a parameter of quality inspection. In the present embodiment, in this case, this is regarded as an instruction of using the quality inspection device that is defined on the printing services system 103 side for quality inspection.

Figure 18B:
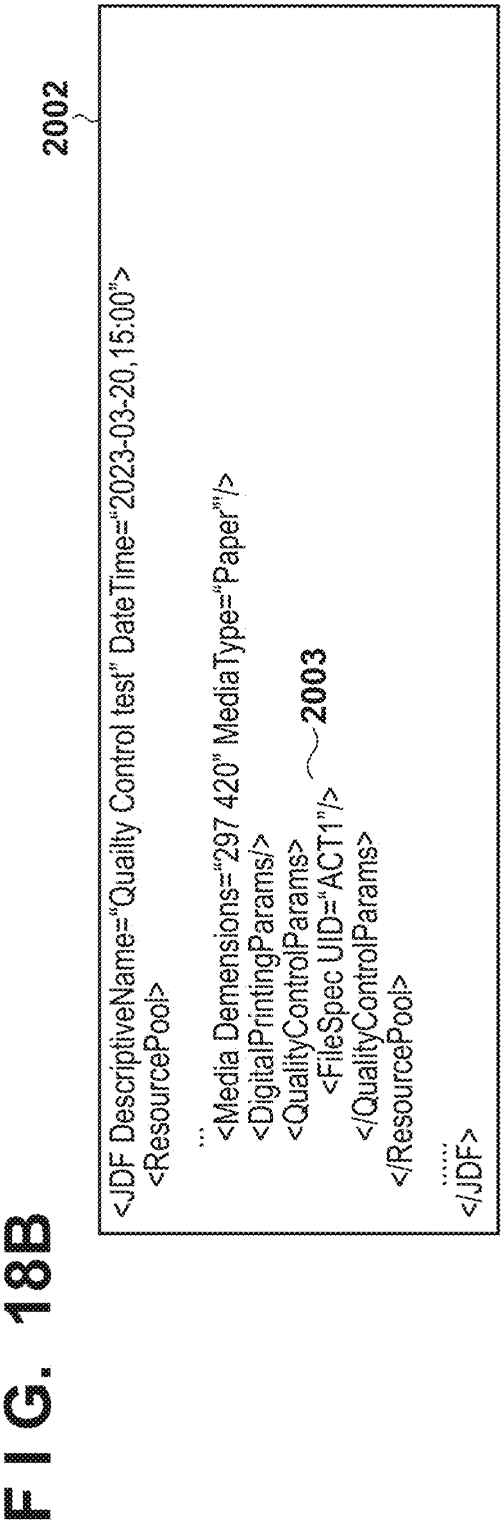
Figure 18C:
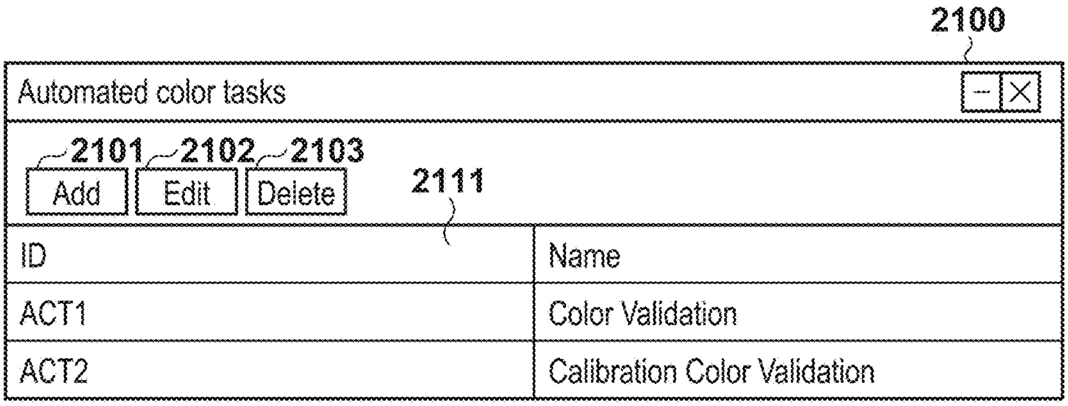
Figure 18D:
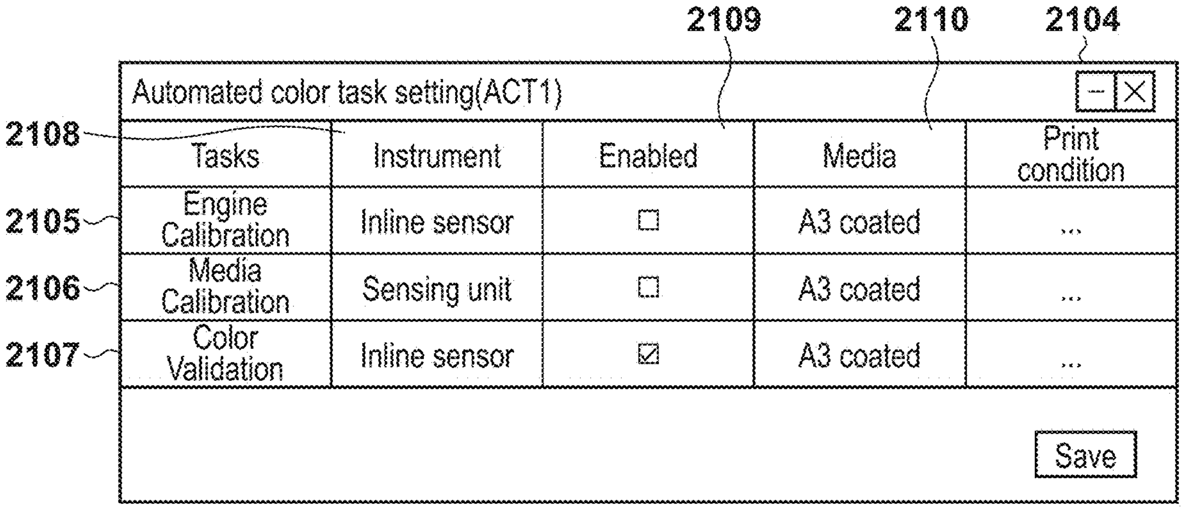

FIG. 18C and FIG. 18D are diagrams illustrating one example of a quality inspection setting screen displayed by the information processing device 104 for controlling the image formation device 106. With the information processing device 104, a user can set quality inspection to be executed in the image formation device 106.

A screen 2100 in FIG. 18C is a diagram illustrating one example of a quality inspection setting screen. On the quality inspection setting screen 2100, a list of quality inspection settings being set is displayed. A user can confirm the generated quality inspection setting on the screen 2100. A quality inspection setting can be newly generated by an adding button 2101, an existing quality inspection setting can be changed by an editing button 2102, and an existing quality inspection setting can be deleted by a deleting button 2103.

An editing screen 2104 in FIG. 18D is an editing screen for the quality inspection setting selected on the quality inspection setting screen 2100. On the editing screen 2104, a list of tasks that can be executed by the quality inspection device mounted to the image formation device 106 is displayed. A task 2105 indicates engine calibration, a task 2106 indicates media calibration, and a task 2107 indicates color validation. A user can set a quality inspection device 2108 to be used or a medium 2110 with respect to a desired task to be executed. Then, a user selects (actives) a check box 2109 corresponding to a desired task to be executed. Note that, for example, the information generated in FIG. 18C and FIG. 18D is transmitted to the information processing device 102 in S1000 in FIG. 8.

When the quality inspection instruction in the JDF 2000 in FIG. 18A is received from the information processing device 102, the quality inspection device that is set on the quality inspection setting screen 2100 and the editing screen 2104 is used to execute quality inspection.

Figure 17B:
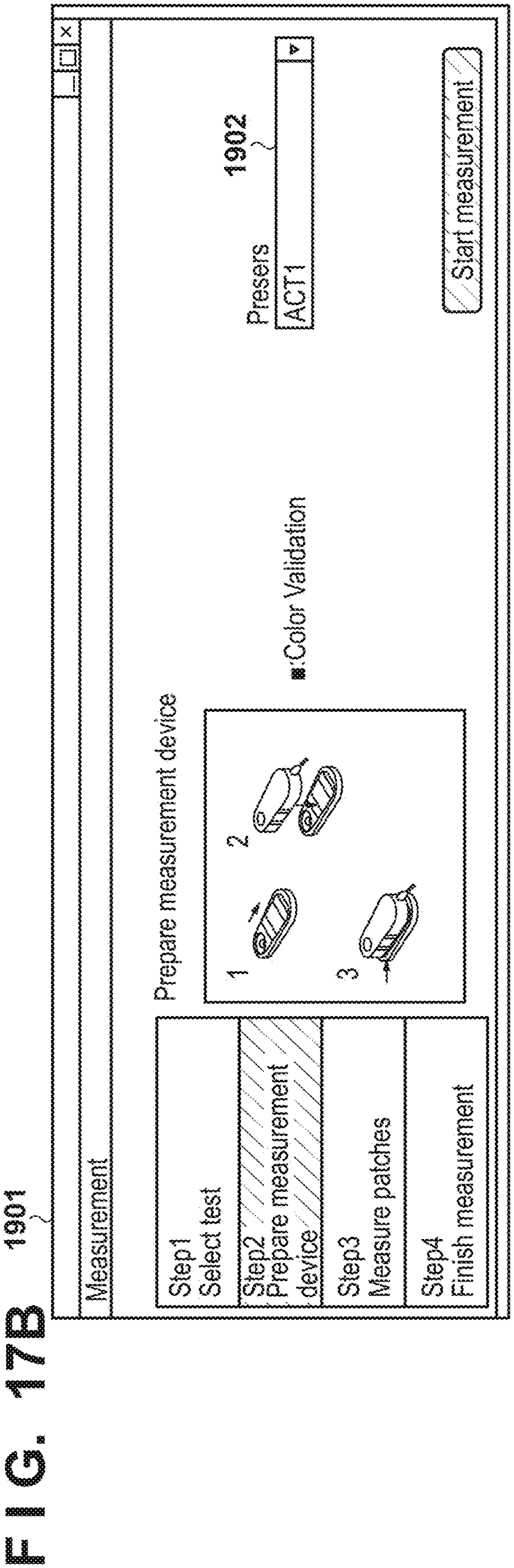

FIG. 17B is a diagram illustrating another example of the color validation setting screen displayed when the quality inspection setting is defined in advance on the printing services system 103 side. A drop down 1902 on a color validation setting screen 1901 displays a name of the quality inspection setting that is defined in advance on the printing services system 103 side. A user can explicitly specify the quality inspection setting by selecting the quality inspection setting with the drop down 1902.

FIG. 18B is a diagram illustrating one example of the quality inspection instruction that is generated when the quality inspection setting is selected with the drop down 1902. In a JDF 2002, an identifier "ACT 1" of the quality inspection setting is described in a UID attribution in information 2003.

When the quality inspection instruction in the JDF 2002 in FIG. 18B is received from the information processing device 102, quality inspection is executed according to the quality inspection setting that is set on the quality inspection setting screen 2100 and the editing screen 2104.

As described above, according to the present embodiment, when the quality inspection device to be used for quality inspection is defined in advance on the printing services system 103 side, quality inspection can be executed by using the quality inspection device.

Fourth Embodiment

A fourth embodiment is described below, focusing on the differences from the first to third embodiments. In the present embodiment, description is made on quality inspection processing executed when a plurality of quality inspection devices are selected by the information processing device 102. In the present embodiment, as one example, description is made on a case where quality inspection is executed in the image formation device 106.

Figure 19:
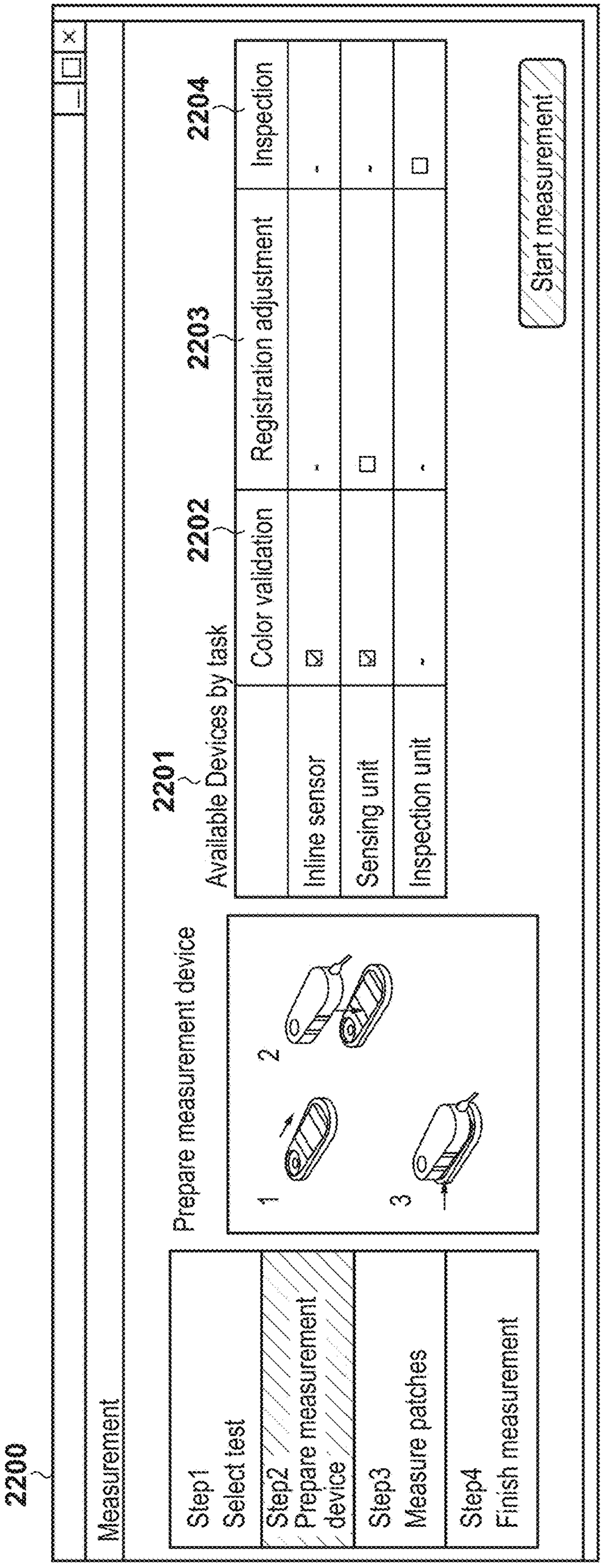
FIG. 19 is a diagram illustrating a user interface screen.

FIG. 19 is a diagram illustrating one example of a color validation setting screen displayed by the information processing device 102. On the color validation setting screen 2200, a plurality of quality inspection devices to be used for color validation are specified. A column 2201 indicates the quality inspection devices mounted to the image formation device 106. "The inline sensor" corresponds to the measurement device 302 in FIG. 2, "the sensing unit" corresponds to the quality inspection device 300 in FIG. 2, and "the inspection unit" corresponds to the quality inspection device 301 in FIG. 2.

Columns 2202, 2203, and 2204 indicate quality inspection that can be executed by the above-mentioned quality inspection devices. The column 2202 indicates color validation, the column 2203 indicates registration adjustment, and the column 2204 indicates inspection. For example, the check box indicates that color validation in the column 2202 can be executed by the measurement device 302 and the quality inspection device 300. A check box is not displayed for the quality inspection device 301 that cannot execute color validation. A user can select a quality inspection device by switching on the check box.

In the present embodiment, a user selects the plurality of quality inspection devices for one type of quality inspection on the color validation setting screen 2200. For example, for color validation in the column 2202, a user can switch on the check boxes of "the inline sensor" and "the sensing unit".

FIG. 20A is a diagram illustrating one example of the quality inspection instruction generated when the plurality of quality inspection devices are specified. In a JDF 2300, "the inline sensor" and "the sensing unit" that are specified for color validation in the column 2202 on the color validation setting screen 2200 in FIG. 19 are specified in information 2302 and information 2303, respectively.

FIG. 20B is a diagram illustrating one example of a quality inspection report transmitted from the information processing device 104 when the plurality of quality inspection devices are specified. In JDF 2301, the color validation results are described in information 2304 and information 2305 for the respective quality inspection devices that are specified on the color validation setting screen 2200 in FIG. 19.

Figure 21:
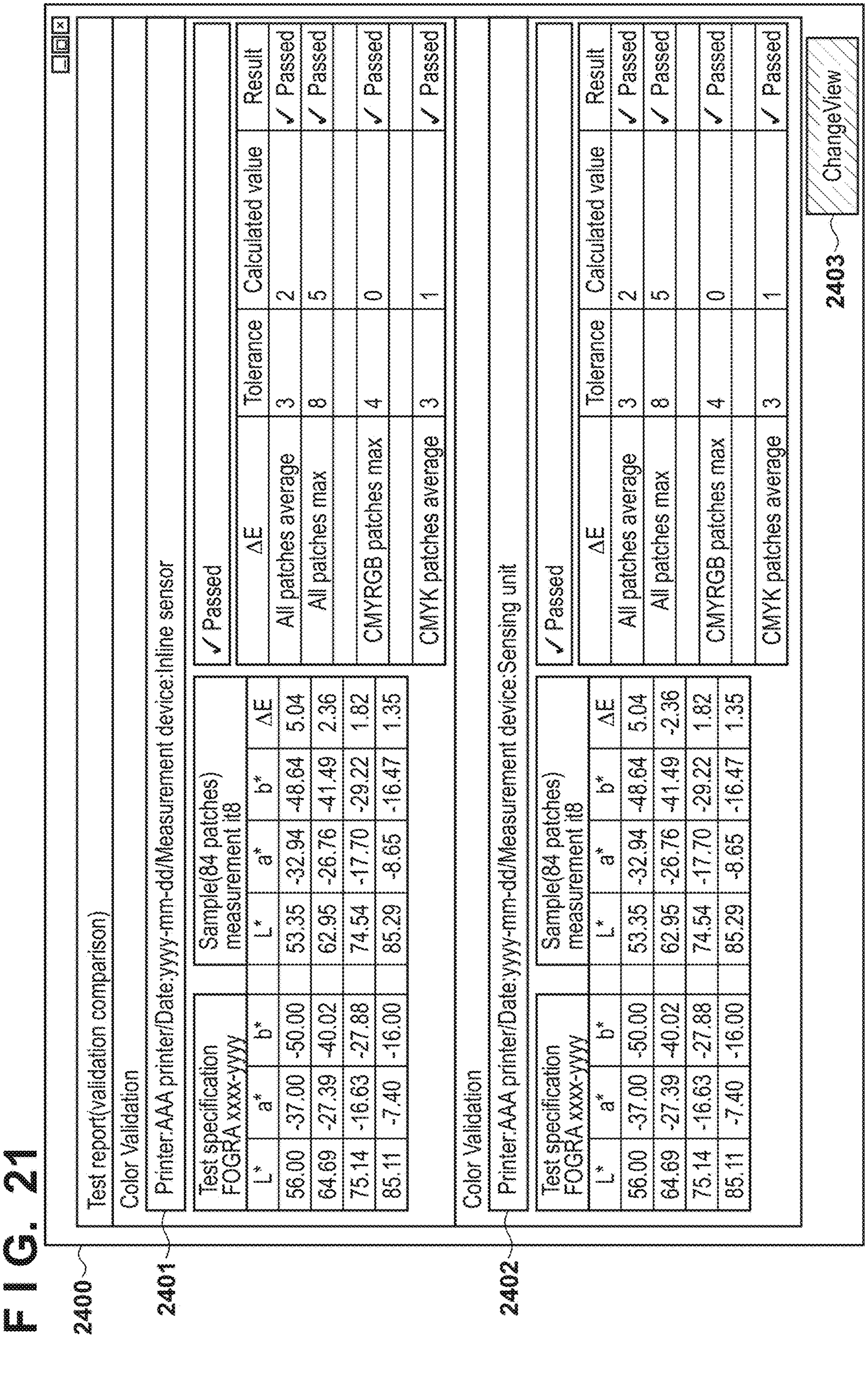
FIG. 21 is a diagram illustrating a user interface screen.

FIG. 21 is a diagram illustrating one example of a color validation result screen displayed by the information processing device 102 that receives the color validation result in FIG. 20B. A color validation result screen 2400 in FIG. 21 is one example of a color validation result screen when the plurality of quality inspection devices are specified for color validation. A display 2401 and a display 2402 respectively display color validation results acquired by using different quality inspection devices. A user can compare the validation results of the plurality of quality inspection devices on the color validation result screen 2400, and the user can select a quality inspection device that matches more with a user expectation. When a button 2403 is pressed down, the view is switched to a different view illustrated in FIG. 22A, based on this color validation result.

Figure 22A:
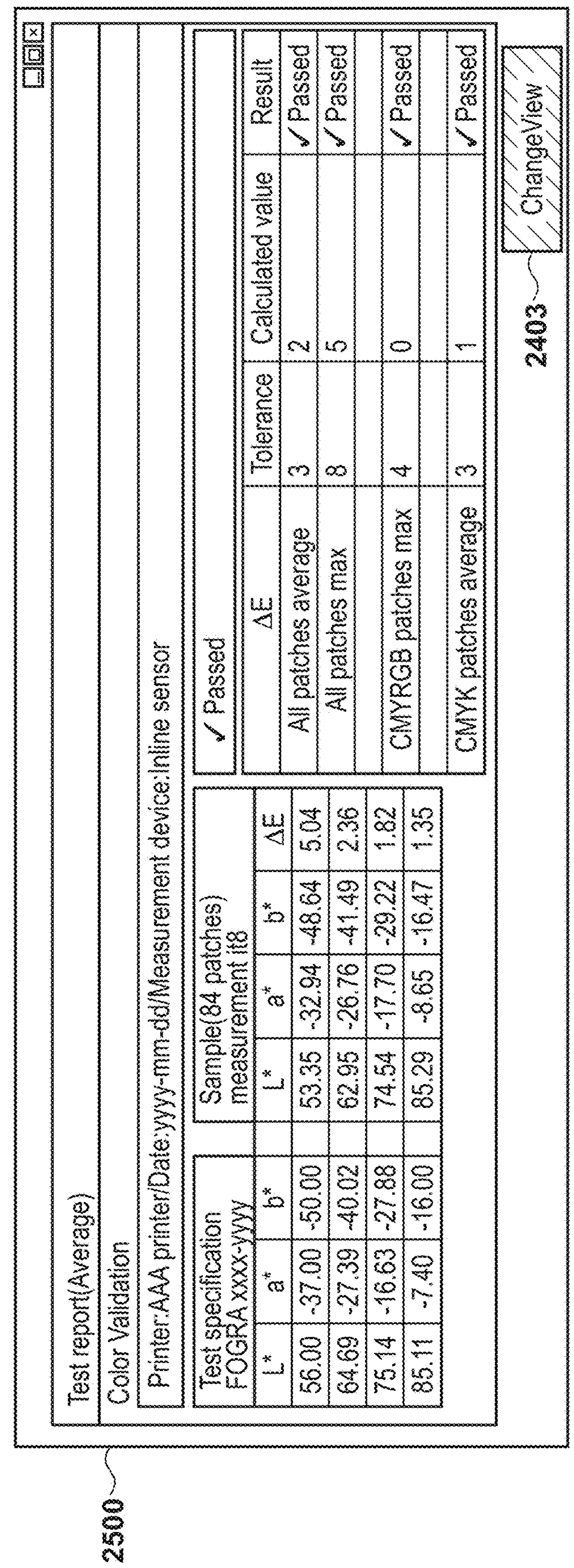
FIG. 22A and FIG. 22B are diagrams illustrating a user interface screen.

A color validation result screen 2500 in FIG. 22A is a color validation result screen in another display mode, which is displayed when the button 2403 in FIG. 21 is pressed down. On the color validation result screen 2500, the measurement results (color measurement) of the respective quality inspection devices displayed on the color validation result screen 2400 in FIG. 21 are subjected to averaging to acquire one value. For example, a value acquired by averaging the color measurement values is displayed. With this, a user can analyze average color consistency when quality inspection is executed in the image formation device 106, regardless of a device difference among the quality inspection devices mounted on the image formation device 106.

Figure 22B:
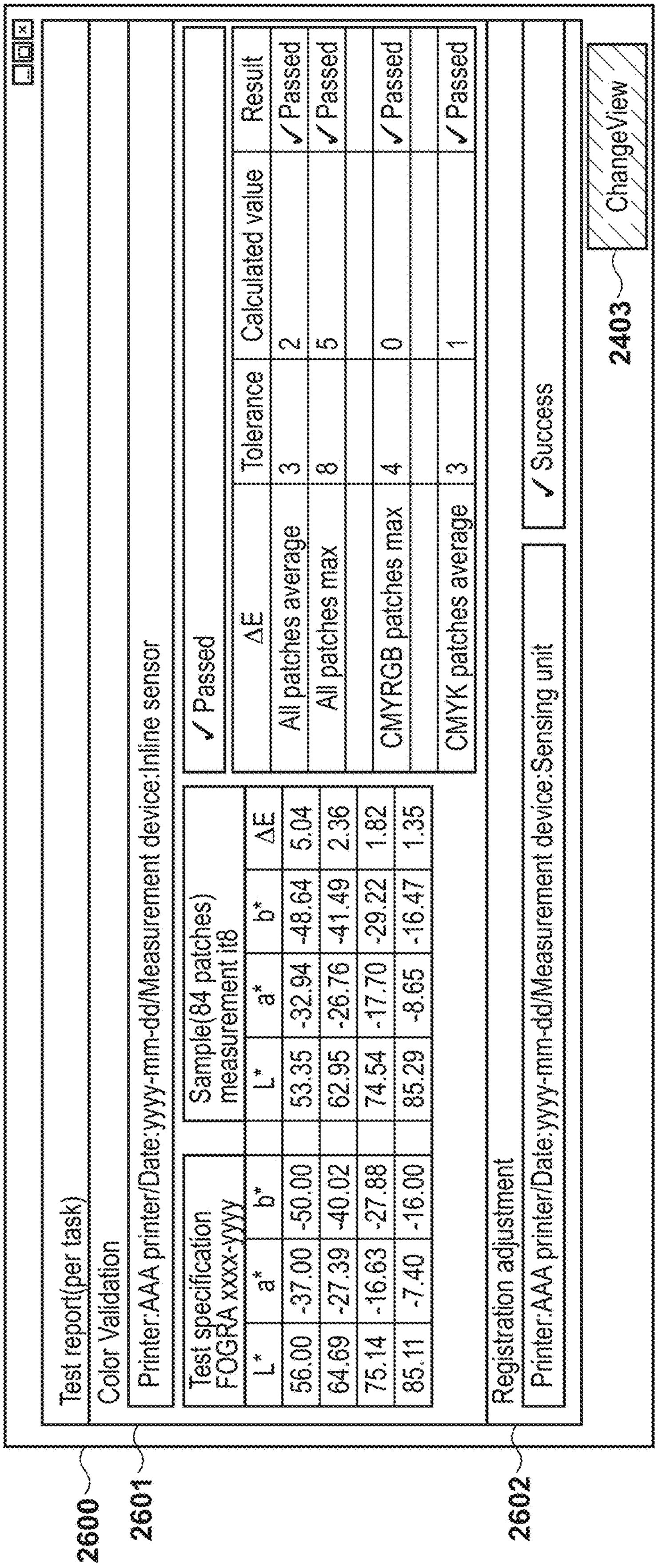

FIG. 22B is a diagram illustrating one example of a color validation result screen when the same quality inspection device is specified for a plurality of types of quality inspection. A display 2601 displays a color validation result, and a display 2602 displays a misregistration correction result.

Figure 23:
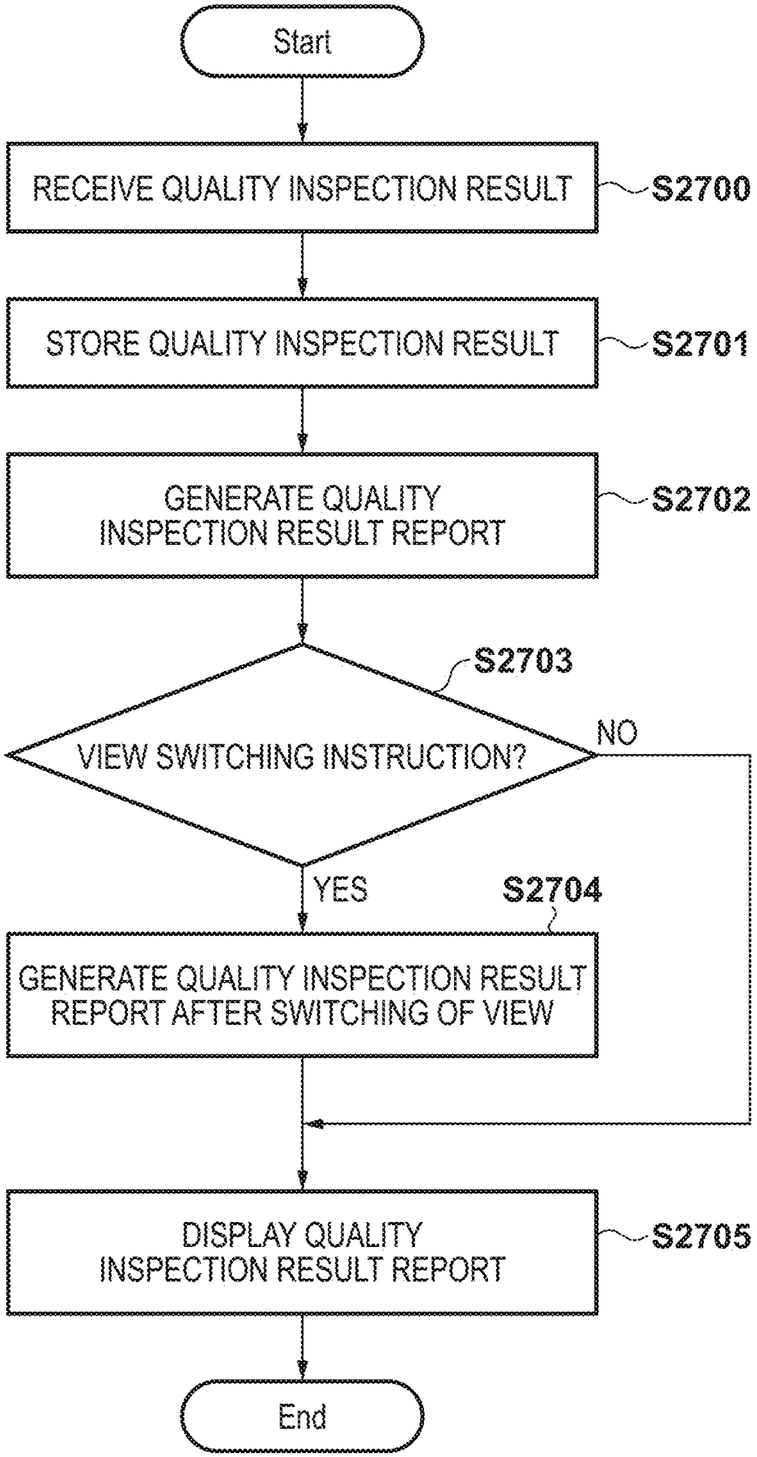
FIG. 23 is a flowchart illustrating processing of displaying a quality inspection result report.

FIG. 23 is a flowchart illustrating processing of generating a color validation report and displaying a color validation result, which is executed in the information processing device 102, when a plurality of quality inspection devices are specified. The processing in FIG. 23 is realized by the CPU 201 of the information processing device 102, for example, reading a program stored in the ROM 203 to the RAM 202 and executing the same.

S2700 to S2702 are similar to S1300 to S1302 in FIG. 11, and hence description therefor is omitted.

In S2703, the CPU 201 causes the quality inspection report generation unit 503 to determine whether a view switching instruction is received. For example, when the button 2403 on the color validation result screen 2400 is pressed down, the CPU 201 determines that the view switching instruction is received. When it is determined that the view switching instruction is received, the processing proceeds to S2704. When it is determined that the view switching instruction is not received, the processing proceeds to S2705.

In S2704, the CPU 201 causes the quality inspection report generation unit 503 to generate a quality inspection result report for displaying a different view using the same quality inspection result, which is similar to the color validation result screen 2500 in FIG. 22, based on the quality inspection result. For example, as described above, the CPU 201 calculates the value acquired by averaging the color measurement values of the respective quality inspection devices, and generates the quality inspection result report for displaying the calculation result.

In S2705, the CPU 201 causes the quality inspection report generation unit 503 to display the color validation result screen, based on the quality inspection report. When the view switching instruction is received, the view based on the quality result report generated in S2704 is displayed. When the view switching instruction is not received, the view based on the quality result report generated in S2702 is displayed. Then, the processing in FIG. 23 is finished.

As described above, according to the present embodiment, when a plurality of quality inspection devices are specified, quality inspection can be executed by using the specified quality inspection devices. Further, the quality inspection report can be displayed while performing switching among a plurality of types of views.

Fifth Embodiment

A fifth embodiment is described below, focusing on the differences from the first to fourth embodiments. In the first to fourth embodiment, description is made on a configuration in which a name of the quality inspection device is displayed on a screen for selecting the quality inspection device. In the present embodiment, description is made on a configuration of additionally displaying the supplementary information when a user selects a quality inspection device.

Figure 24A:
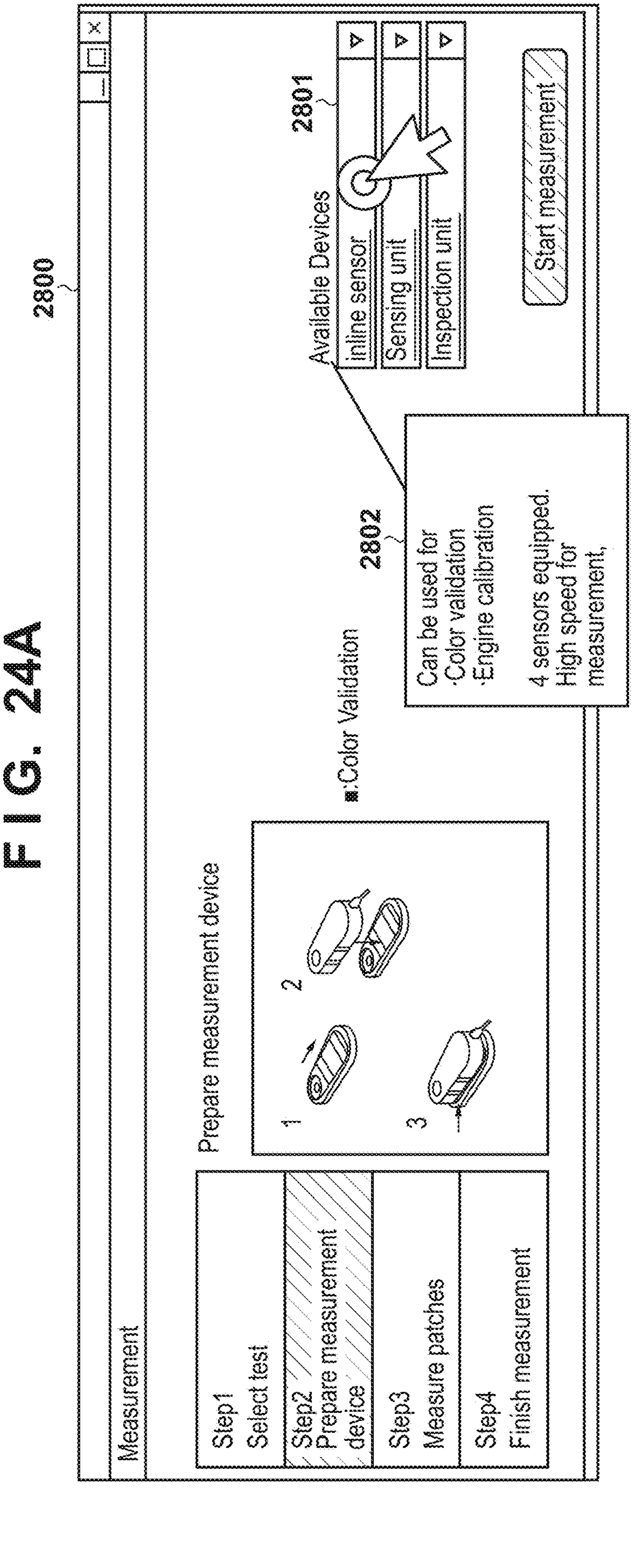
FIG. 24A and FIG. 24B are diagrams illustrating a user interface screen and communication data.

FIG. 24A is a diagram illustrating one example of a color validation setting screen displayed by the information processing device 102. In the drawing, a color validation setting screen 2800 is one example of a screen for additionally displaying the supplementary information when a user selects a quality inspection device.

Figure 24B:
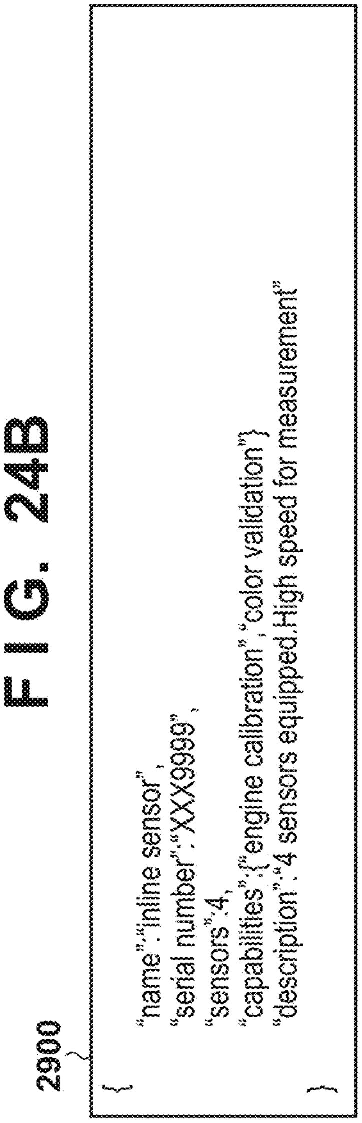

A drop down 2801 displays, in an expanded manner, a list of the quality inspection devices mounted to the image formation device 106. Information 2802 is one example of the supplementary information displayed when mouse hovering is performed on a name of the quality inspection device displayed in the drop down 2801. As the information 2802, quality inspection that can be executed by "the inline sensor" on which mouse hovering is performed and information for describing features of the quality inspection device are displayed. The information being displayed herein is information acquired based on the information 914 (Manufacturer URL) in the JMF 911 in FIG. 7D. In other words, supplementary information exemplified by information 2900 in FIG. 24B is acquired from the URL indicated in the information 914. The information 2900 in FIG. 24B is information expressed in a JSON format that is generally used in a web system. Alternatively, the information 2900 may be information expressed in an HTML format or an XML format.

Figures 25, 26:
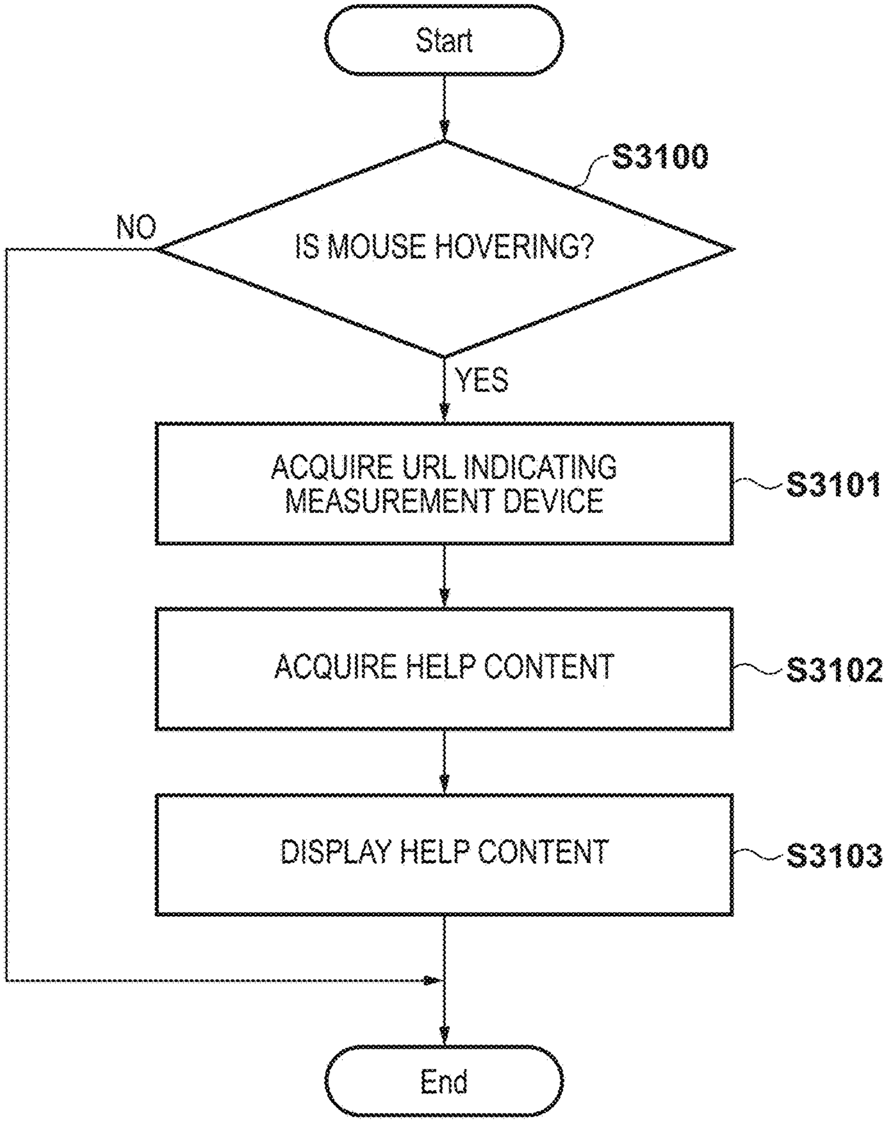
FIG. 25 is a diagram illustrating a database.
FIG. 26 is a flowchart illustrating processing for displaying supplementary information.

Although a database 3000 in FIG. 25 is omitted in FIG. 4, FIG. 25 is a diagram illustrating one example of a supplementary information database configured in the information processing device 102. The supplementary information database 3000 stores the above-mentioned supplementary information, and the storage location of the supplementary information is described in the information 914 (Manufacturer URL) in FIG. 7D.

A column 3001 indicates a file name of the supplementary information, and it corresponds to the quality inspection device. A column 3002 indicates an update date/time of the supplementary information. A column 3003 indicates a data type of the supplementary information, and it indicates that the information is stored in a Binary Large Object (Blob) data type in FIG. 25. A column 3004 indicates a file size of the supplementary information.

FIG. 26 is a flowchart illustrating processing for displaying supplementary information. The processing in FIG. 31 is realized by the CPU 201 of the information processing device 102, for example, reading a program stored in the ROM 203 to the RAM 202 and executing the same.

In S3100, the CPU 201 causes the instruction reception unit 500 to determine whether mouse hovering is performed on a name of the quality inspection device on the list displayed in the drop down 2801 on the color validation setting screen 2800. When it is determined that mouse hovering is performed, the processing proceeds to S3101. When it is determined that mouse hovering is not performed, the processing in FIG. 26 is finished.

In S3101, the CPU 201 causes the instruction reception unit 500 to acquire the URL of the supplementary information described in the JMF acquired from the image formation device. In S3102, the CPU 201 causes the instruction reception unit 500 to acquire the supplementary information stored in the URL acquired in S3101. For example, the information 2900 in FIG. 24B is acquired.

In S3103, the CPU 201 causes the instruction reception unit 500 to display the supplementary information acquired in S3102. Note that the supplementary information may be displayed as a tooltip of the quality inspection device on which mouse hovering is performed, may be displayed as another dialog, or may be displayed as another frame on the screen that is currently displayed.

As described above, according to the present embodiment, when a user selects a quality inspection device, the supplementary information relating to the quality inspection device is additionally displayed. With this, a user can select a desired quality inspection device more easily.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-107225, filed Jun. 29, 2023, which is hereby incorporated by reference herein in its entirety.

What is claimed is:

1. A quality inspection system comprising:
an information processing device; and
an image formation system,
the information processing device comprising:
at least one processor and at least a memory coupled to the at least one processor and having instructions stored thereon, and when executed by the at least one processor, acting as:
an acquisition unit configured to acquire information relating to a quality inspection device included in the image formation system;
a reception unit configured to receive information relating to quality inspection to be executed by the quality inspection device;
a display unit configured to display a quality inspection device for executing quality inspection corresponding to the information received by the reception unit, based on the information relating to the quality inspection device acquired by the acquisition unit, in a selectable manner by a user; and
a transmission unit configured to transmit, to the image formation system, an instruction for causing the quality inspection device selected by the user to execute the quality inspection, and
the image formation system comprising:
at least one processor and at least a memory coupled to the at least one processor and having instructions stored thereon, and when executed by the at least one processor, acting as:
an execution unit configured to execute the quality inspection by the quality inspection device, based on the instruction being transmitted from the transmission unit; and
a setting unit configured to set a predetermined quality inspection device, wherein the acquisition unit acquires information relating to the predetermined quality inspection device set by the setting unit, the information relating to the quality inspection includes a level of the quality inspection, and when the reception unit receives, as the information relating to the quality inspection, information indicating that the predetermined quality inspection device is used, the transmission unit transmits the instruction for causing the predetermined quality inspection device to execute the quality inspection.

2. The quality inspection system according to claim 1, wherein the information relating to the quality inspection includes information indicating that the quality inspection device executing the quality inspection is used.

3. The quality inspection system according to claim 1, wherein the at least one processor of the information processing device is configured to further act as:

a second acquisition unit configured to acquire a result of the quality inspection being executed by the execution unit; and a second display unit configured to display a screen indicating the result of the quality inspection, based on the result of the quality inspection that is acquired by the second acquisition unit.

4. The quality inspection system according to claim 3, wherein the at least one processor of the information processing device is configured to further act as:

a generation unit configured to generate the instruction, based on the quality inspection device being selected by the used, and the transmission unit transmits the instruction being generated by the generation unit to the image formation system.

5. The quality inspection system according to claim 4, wherein when a plurality of quality inspection devices are selected by a user, the generation unit generates instruction for causing the plurality of quality inspection devices to execute quality inspection.

6. The quality inspection system according to claim 5, wherein the execution unit executes the same quality inspection for the plurality of quality inspection devices.

7. The quality inspection system according to claim 5, wherein the execution unit executes quality inspection different for each of the plurality of quality inspection devices.

8. The quality inspection system according to claim 5, wherein in the instruction, the order of execution by the execution units for the plurality of quality inspection devices is determined.

9. The quality inspection system according to claim 5, wherein the at least one processor of the information processing device is configured to further act as:

a switching unit configured to switch display modes of the second display unit, based on the result of the quality inspection executed by the plurality of quality inspection devices, the result being acquired by the second acquisition unit.

10. The quality inspection system according to claim 9, wherein when the same quality inspection is executed for the plurality of quality inspection devices, the switching unit switches the display modes of the second display unit between a first display mode and a second display mode.

11. The quality inspection system according to claim 10, wherein the first display mode is a mode of displaying a result of quality inspection corresponding to each of the plurality of quality inspection devices.

12. The quality inspection system according to claim 10, wherein the second display mode is a mode of displaying a result acquired from a result of quality inspection corresponding to each of the plurality of quality inspection devices.

13. The quality inspection system according to claim 1, wherein the display unit displays the information relating to the quality inspection device being acquired by the acquisition unit, as supplementary information for supplements a name of the quality inspection device.

14. The quality inspection system according to claim 1, wherein the quality inspection device includes at least one of an inline sensor, a sensing unit, and an inspection unit.

15. The quality inspection system according to claim 1, wherein the image formation system includes an image formation device, and the quality inspection device includes a quality inspection device embedded in the image formation device.

16. The quality inspection system according to claim 15, wherein the quality inspection device includes a quality inspection device to be connected to the image formation device.

17. A method for a quality inspection system including an information processing device and an image formation system, the method comprising:

acquiring, by the information processing device, information relating to a quality inspection device included in the image formation system;

receiving, by the information processing device, information relating to quality inspection to be executed by the quality inspection device;

displaying, by the information processing device, a quality inspection device for executing quality inspection corresponding to the information received, based on the information relating to the quality inspection device acquired, so that a user can perform selection;

transmitting, by the information processing device to the image formation system, an instruction for causing the quality inspection device selected by the user to execute the quality inspection;

in the image formation system, executing, by the quality inspection device, the quality inspection, based on the instruction being transmitted; and in the image formation system, setting a predetermined quality inspection device, wherein the acquiring acquires information relating to the predetermined quality inspection device set by the setting unit, the information relating to the quality inspection includes a level of the quality inspection, and when the receiving receives, as the information relating to the quality inspection, information indicating that the predetermined quality inspection device is used, the transmitting transmits the instruction for causing the predetermined quality inspection device to execute the quality inspection.

* * * * *